(12) United States Patent
Bragg et al.

(10) Patent No.: US 8,146,654 B2
(45) Date of Patent: Apr. 3, 2012

(54) COMPOSITION AND METHOD FOR USING WAXY OIL-EXTERNAL EMULSIONS TO MODIFY RESERVOIR PERMEABILITY PROFILES

(75) Inventors: James R. Bragg, Houston, TX (US); Joseph P. Lederhos, Houston, TX (US); Sergio A. Leonardi, Pearland, TX (US); Scott E. Hommema, Pearland, TX (US); Amy L. Chen, Cypress, TX (US); Shan H. Yang, Sugar Land, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 307 days.

(21) Appl. No.: 12/306,242

(22) PCT Filed: Jun. 18, 2007

(86) PCT No.: PCT/US2007/014218
§ 371 (c)(1), (2), (4) Date: Jun. 22, 2009

(87) PCT Pub. No.: WO2008/024147
PCT Pub. Date: Feb. 28, 2008

(65) Prior Publication Data
US 2009/0301714 A1   Dec. 10, 2009

Related U.S. Application Data

(60) Provisional application No. 60/839,653, filed on Aug. 23, 2006.

(51) Int. Cl.
E21B 33/138 (2006.01)
E21B 43/22 (2006.01)
E21B 43/24 (2006.01)
E21B 47/00 (2006.01)
E21B 47/10 (2006.01)

(52) U.S. Cl. ............. 166/250.01; 166/263; 166/270; 166/272.1; 166/288; 166/294; 166/302; 166/303; 166/304; 507/203; 507/904

(58) Field of Classification Search ............... 166/288
See application file for complete search history.

(56) References Cited

U.S. PATENT DOCUMENTS
2,779,416 A * 1/1957 Clark, Jr. .................. 166/294
(Continued)

FOREIGN PATENT DOCUMENTS
SU   872734   10/1981
(Continued)

OTHER PUBLICATIONS
European Search Report No. 114388, Jan. 17, 2007, 1 page.
(Continued)

Primary Examiner — George Suchfield
(74) Attorney, Agent, or Firm — ExxonMobil Upstream Research Company- Law Department

(57) ABSTRACT

A waxy oil-external emulsion is provided for injection into a selected zone of a subsurface formation. The selected zone is typically a high permeability zone. The emulsion generally comprises oil, added wax, and water. The emulsion may also include an emulsifying agent and a solvent. The emulsion is formulated to be a liquid at a temperature greater than a targeted temperature in the subsurface formation, but a solid at the targeted temperature. The targeted temperature is typically the maximum operating temperature for the formation. A method of formulating the emulsion is also provided. Further, a method of plugging a high permeability zone using the emulsion is disclosed.

46 Claims, 8 Drawing Sheets

U.S. PATENT DOCUMENTS

| | | | |
|---|---|---|---|
| 2,799,341 A * | 7/1957 | Maly | 166/288 |
| 3,060,136 A | 10/1962 | Nelson et al. | |
| 3,108,441 A | 10/1963 | Watson | |
| 3,437,146 A | 4/1969 | Everhart et al. | |
| 3,509,951 A | 5/1970 | Enochs | |
| 3,630,953 A | 12/1971 | Simon et al. | |
| 3,682,249 A | 8/1972 | Fischer et al. | |
| 3,756,319 A | 9/1973 | Holm et al. | |
| 3,965,986 A | 6/1976 | Christopher | |
| 4,192,753 A | 3/1980 | Pye et al. | |
| 4,359,391 A | 11/1982 | Salathiel et al. | |
| 4,475,594 A | 10/1984 | Drake et al. | |
| 4,525,285 A | 6/1985 | Son et al. | |
| 4,732,213 A | 3/1988 | Bennett et al. | |
| 4,741,401 A | 5/1988 | Walles et al. | |
| 4,842,070 A * | 6/1989 | Sharp | 166/288 |
| 4,891,072 A | 1/1990 | Cooper | |
| 5,247,994 A | 9/1993 | Nenniger | |
| 5,373,901 A | 12/1994 | Norman et al. | |
| 5,836,390 A | 11/1998 | Apps et al. | |
| 5,855,243 A | 1/1999 | Bragg | |
| 5,910,467 A | 6/1999 | Bragg | |
| 5,927,404 A | 7/1999 | Bragg | |
| 6,059,036 A | 5/2000 | Chatterji et al. | |
| 6,068,054 A | 5/2000 | Bragg | |
| 6,302,209 B1 | 10/2001 | Thompson, Sr. et al. | |
| 6,632,778 B1 | 10/2003 | Ayoub et al. | |
| 6,716,282 B2 | 4/2004 | Griffith et al. | |
| 6,734,144 B2 | 5/2004 | Varadaraj et al. | |
| 6,860,936 B2 * | 3/2005 | Carter, Jr. | 106/718 |
| 6,988,550 B2 | 1/2006 | Bragg et al. | |
| 7,121,339 B2 | 10/2006 | Bragg et al. | |
| 7,186,673 B2 | 3/2007 | Varadaraj et al. | |
| 7,703,513 B2 * | 4/2010 | Vinegar et al. | 166/245 |
| 2010/0044042 A1 * | 2/2010 | Carter, Jr. | 166/288 |

FOREIGN PATENT DOCUMENTS

SU 912914 3/1982

OTHER PUBLICATIONS

Thomas, F. B. et al., "Water Shutoff Treatments—Reduce Water and Accelerate Oil Production", Paper No. 98-47, 49th Annual Technical Meeting of the Petroleum Society of CIM, Jun. 8-10, 1998, pp. 1-10, Calgary, AB, Canada.

* cited by examiner

COMPOSITION AND METHOD FOR USING WAXY OIL-EXTERNAL EMULSIONS TO MODIFY RESERVOIR PERMEABILITY PROFILES

This application is the National Stage of International Application No. PCT/US2007/014218, filed 18 Jun. 2007, which claims the benefit of U.S. Provisional Application No. 60/839,653, filed 23 Aug. 2006.

BACKGROUND OF THE INVENTION

1. Field of the Invention

This invention relates to the production of hydrocarbons from a subsurface reservoir. More specifically, the invention pertains to a composition and method for reducing permeability of selected portions of a reservoir to prevent the bypass of fluids.

2. Background of the Invention

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of prior art.

Hydrocarbons are generally produced from rock matrices existing many hundreds or even thousands of feet below the earth surface. To recover such hydrocarbons, one or more wells are drilled to the depth of the hydrocarbon-bearing reservoir. Once the wells are completed, reservoir fluids are drained from the rock matrix and into a wellbore where they are produced to the earth surface.

The reservoir from which hydrocarbons are produced has various characteristics. These include temperature, pressure, porosity, and permeability. Ideally, permeability within the reservoir is uniform. The presence of areas with permeability higher than that of other portions of the hydrocarbon-bearing rock can cause an uneven flow of fluids through the rock matrix and into the wellbore.

Subsurface zones with permeability higher than the average of the producing interval are sometimes referred to as "thief zones." A thief zone may be a naturally-occurring region of the reservoir. Such regions can exist as layers formed during the natural geologic depositional process. Streaks of high porosity and permeability are common in carbonate reservoirs. These regions can also occur in sandstone reservoirs in the form of fractures or other channels of very high porosity and permeability.

In another instance, a thief zone may be created during the primary production of hydrocarbons, forming a channel or "wommhole." Such channels may be caused by the production of sand from an unconsolidated formation along with the oil or water. These channels can hasten production of high volumes of water during primary recovery operations when the channel connects the producer to a source of water, such as an aquifer.

Thief zones can also significantly alter the sweep of injected fluids in a secondary or tertiary flood operation such as water flooding or gas flooding. Such thief zones can cause bypassing of oil and early breakthrough of fluids, such as water or gas, injected into the reservoir from injection wells to displace oil, resulting in large amounts of the displacing fluid being produced from production wells. Thief zones, therefore, can cause inefficient production of the desired hydrocarbons and reduce oil recovery.

Several fluid diversion and permeability profile modification techniques for reducing the permeability of thief zones have been disclosed in the prior art. Many of these have attempted to modify the vertical permeability profile of the reservoir at the well face or within a few feet of the wellbore. However, thief zones can extend to great distances from an injection or production well. Thus, measures taken to plug thief zones within a few feet of a wellbore are of limited value.

In some cases, the depth of treatment is restricted because the technique employs injection of fluids that only penetrate a small distance into the reservoir. In other instances, depth of treatment may be limited because the fluid that is injected relies upon a chemical reaction to induce fluid thickening or relies upon phase change that occurs rapidly and limits the injection time. Such treatment methods are often ineffective because adjacent strata within the subsurface production zone, having both high and low permeability, are often in fluid communication throughout a substantial portion of the reservoir between wells. Therefore, even if the high permeability zone is plugged near-wellbore, cross-flow from lower permeability pay to the thief zone at greater distances from the wells reduces the effectiveness. In this instance, fluids injected to displace oil can still bypass much of the hydrocarbon-bearing rock.

Some processes have been directed at modifying the permeability profile of the formation during drilling. However, these processes are primarily intended to minimize the loss of drilling mud. Such processes also fall into the class of near-wellbore treatments.

Some of the above technologies are disclosed in the patent literature. Patents which relate to the sealing of a subsurface zone include U.S. Pat. No. 3,509,951, U.S. Pat. No. 3,965,986, U.S. Pat. No. 4,192,753, U.S. Pat. No. 4,475,594, U.S. Pat. No. 4,732,213, U.S. Pat. No. 5,836,390, U.S. Pat. No. 6,059,036, U.S. Pat. No. 6,302,209, U.S. Pat. No. 6,632,778, and U.S. Pat. No. 6,716,282.

Wax treatments have been previously attempted in the field to plug thief zones. However, these wax treatments have used only a single-phase wax heated above its melting range as the injected fluid. A disadvantage of using a single-phase wax is that its viscosity is very low (approximately 1 centipoise (cp)). The low viscosity permits the injected melted wax to finger through resident fluids, such as water. They are, therefore, not effective in displacing the fluid residing in the thief zone to be plugged, leaving regions of the thief zone without solid wax.

Hence, a need exists for a plugging agent that can be injected into a subsurface formation to substantially fill a thief zone. A need further exists for a plugging agent that can be injected into a high permeability zone that extends a considerable distance from the wellbore. A need further exists for a plugging agent that, after setting in a high permeability zone, provides resistance to flow at pressure gradients experienced within the reservoir during normal operations. Further, a need exists for a plugging agent that is temperature sensitive and can be reversed after setting. Thus, the plugging agent is amenable to being cleaned up or removed from lower permeability zones inadvertently invaded near-wellbore during placement of the solution.

SUMMARY OF THE INVENTION

The present invention relates to the use of a waxy oil-external emulsion that is designed for injection into a hydrocarbon-bearing reservoir to at least partially plug selected subsurface regions or zones. In one aspect, an emulsion is provided which comprises oil, added wax, and water. The emulsion is formulated to be a liquid at a temperature greater than a targeted temperature, but a solid at the targeted temperature. The targeted temperature is typically the maximum operating temperature of the reservoir. In some instances, the targeted temperature may be the reservoir temperature itself. The targeted temperature may be, for example, the temperature of the fluids resident in the formation. The selected zone may be a high permeability zone within the subsurface formation.

Other characteristics may be formulated into the composition. In one embodiment, the waxy emulsion is formulated to have a viscosity greater than that of fluids in the high permeability zone, so that the emulsion displaces reservoir fluids upon injection as a liquid. For instance, the emulsion may be formulated to have a viscosity of about 1.25 to about 3.0 times greater than that of fluids in the high permeability zone. In another aspect, the emulsion is formulated to have a gel strength at the targeted temperature sufficient to plug the high permeability zone during production of reservoir fluids from the subsurface formation. The emulsion may optionally include a solvent for adjusting the viscosity.

The oil in the waxy emulsion may be a crude oil and may be a heavy crude oil. An emulsifying agent may be provided in the emulsion to emulsify the oil and water. For instance, the emulsifying agent may be a surfactant. Alternatively, the emulsifying agent may be fine mineral solids.

The added wax in the emulsion may be a petroleum-derived wax. Alternatively, it may be a non-petroleum wax. In one aspect, the added wax concentration is about 40 to about 50 weight (wt.) percent (%) of the hydrocarbon phase.

A method of plugging a selected zone in a subsurface formation is also provided. In one aspect, the method includes determining a targeted temperature of the formation, and then formulating a waxy oil-external emulsion in accordance with the emulsion described above. In this respect, the waxy oil-external emulsion may generally include oil, added wax, and water, with the waxy oil-external emulsion being formulated to be a liquid at a temperature greater than a targeted temperature and a solid at the targeted temperature. The targeted temperature is typically the maximum operating temperature of the reservoir. In some instances, the targeted temperature may be the reservoir temperature itself.

In one aspect, the method further includes determining the viscosity of the fluids resident in the selected zone. In this instance, the waxy oil-external emulsion is further formulated to have a viscosity substantially equal to or greater than that of the fluids in the selected zone, so that the waxy oil-external emulsion displaces the resident fluids upon injection as a liquid. The waxy oil-external emulsion may further be formulated to have a gel strength at the targeted temperature sufficient to plug a selected zone during production of reservoir fluids from the subsurface formation.

In another aspect, the method further includes heating the waxy oil-external emulsion to a temperature above its melting range, injecting the waxy oil-external emulsion into a wellbore, further injecting the waxy oil-external emulsion through the wellbore and into a selected zone to displace fluids within the selected zone, and shutting in the wellbore for a period of time sufficient to allow the waxy oil-external emulsion to transition from a liquid to a solid, so as to plug at least a portion of the selected zone. Further still, the method may include injecting heated fluids into the wellbore prior to shutting in the wellbore to displace a substantial portion of the waxy oil-external emulsion from the wellbore and into the selected zone.

In another aspect, the method further includes determining an estimated volume of the selected zone to be plugged. In this instance, injecting the waxy emulsion into the selected zone comprises injecting an amount of emulsion through an injection tubing to substantially fill the estimated volume. The emulsion may be injected into either an injection or a production well. Thereafter, a volume of displacement fluid may be injected to displace emulsion in the injection tubing. Further, a heated cleaning fluid may be circulated through the injection tubing to remove solidified emulsion from the wellbore.

A method of removing a plugging agent from an artificially plugged zone in a subsurface formation is also provided herein. In one aspect, the method includes providing thermal energy to the plugged zone to warm the plugging agent, thereby causing the plugging agent to transition from a solid to a liquid, and producing the liquefied plugging agent through a wellbore to a surface. Preferably, the plugging agent is a waxy emulsion comprised of oil, added wax, and water.

Providing thermal energy to the plugged zone may comprise heating the wellbore by circulating a heated fluid. Further, the method may include setting packers in the wellbore before injecting a heated fluid through the wellbore and into a plugged zone. In this way, the heated fluid is directed into a desired depth of the formation. The method of removing a plugging agent may further include injecting a fluid through an injection well to sweep the liquefied emulsion to the wellbore, which may be a production wellbore.

Finally, a method of formulating a plugging agent for a subsurface reservoir is provided. In one aspect, the method includes acquiring an oil, selecting various wax additives, blending the oil and the wax additives in various weight percentages to form various hydrocarbon blends, determining the melting range of the various blends, determining the viscosity of the various blends, comparing the melting range of the various blends to a temperature of the reservoir, and selecting a composition having a melting range above the reservoir temperature. The method may further include adding water to the selected composition to form a waxy water-in-oil emulsion. Further, an emulsifying agent may be added to emulsify the water with the oil. A solvent may also be added to the emulsion to vary the viscosity. The viscosity should be substantially equal to or greater than that of fluids in the reservoir when the emulsion is at or above the targeted operating temperature.

The method may also include determining the pressure gradient existing in the subsurface reservoir and confirming that the selected composition has a gel strength at the targeted operating temperature in excess of the pressure gradient. The concentration of wax may be increased to increase the gel strength of the waxy emulsion.

BRIEF DESCRIPTION OF THE DRAWINGS

The foregoing and other advantages of the present invention may become apparent upon reviewing the following detailed description and drawings of non-limiting examples of embodiments in which.

DETAILED DESCRIPTION OF CERTAIN EMBODIMENTS

Definitions

Figure 1:
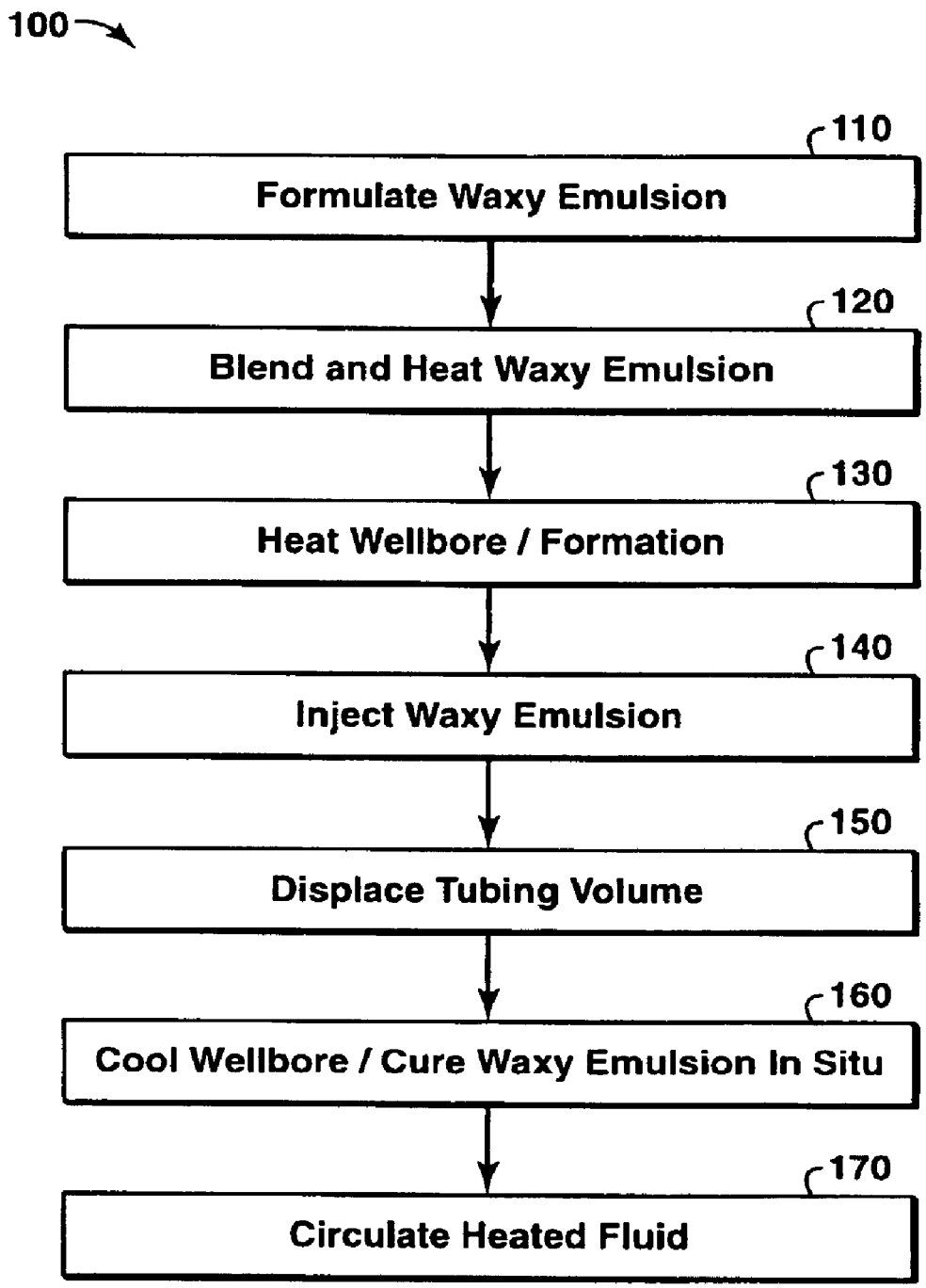
FIG. 1 is a flow chart illustrating a process for plugging a high permeability zone in a subsurface reservoir, in one embodiment.

As used herein, the term "oil" refers to petroleum that exists in the liquid phase in natural subsurface formations and remains liquid at atmospheric conditions of pressure and temperature. Petroleum refers to a complex mixture of hydrocarbons, chemical compounds containing only hydrogen and carbon, with small amounts of other substances. Such other substances may include, for example, oxygen ($O_2$), hydrogen sulfide ($H_2S$), and nitrogen ($N_2$).

The term "crude oil" means any unrefined oil.

The term "heavy oil" is a relative description, comparing properties of one oil to another. The term generally refers to crude oils that are highly viscous and do not flow easily at ambient conditions (15 degrees (°) Celsius (C) and 1 bar). Heavy oil may include aromatics or other complex ring hydrocarbons. Heavy oils may be classified by API gravity. Heavy oils generally have gravities from 100 API to 22.30 API.

As used herein, the term "oil-external emulsion" refers to any emulsion where oil is the continuous phase.

The term "wax" refers to any one of various substances that is substantially hydrophobic, that is insoluble in water, and that has a relatively low viscosity when melted. The wax may, for example, be a petroleum-derived wax such as a paraffin. The wax may alternatively be a non-petroleum natural wax such as, for example, beeswax or vegetable wax. One non-limiting example of a wax is Imperial Oil Wax 1010. Wax may be present in oil naturally or may be added, in which case it is referred to as "added wax."

The term "emulsifying agent" refers to any substance that assists in the formation and stabilization of emulsions. Non-limiting examples of emulsifying agents include surfactants (both ionic and non-ionic), fine mineral solids (such as fumed silica and bentonite), and any pH modifying agent (including, but not limited to metal hydroxides).

The term "solvent" refers to any liquid that is soluble with oil, resulting in a homogeneous mixture. Non-limiting examples include VARSOL™ from Imperial Oil, Ltd. and kerosene.

As used herein, the term "formation" refers to any igneous, sedimentary, or metamorphic rock represented as, a unit or any sedimentary bed or consecutive series of beds sufficiently homogeneous or distinctive to be a unit.

As used herein, the term "reservoir" refers to a formation or a portion of a formation.

As used herein, the term "zone" refers to a reservoir or a portion of a reservoir.

As used herein, the term "wellbore" refers to a hole in a formation made by drilling or insertion of a conduit into the formation. A wellbore may have a circular cross section or other cross-sectional shapes (e.g., ovals, squares, rectangles, triangles, slits, or other regular or irregular shapes). In addition, the cross-section may be variable. As used herein, the term "well," when referring to an opening in the formation, may be used interchangeably with the term "wellbore."

The term "gel strength" refers to the strength of the solidified waxy emulsion. An indicator of gel strength is the maximum pressure gradient that may be applied to the emulsion by a fluid before flow occurs through the plugged area.

DESCRIPTION OF SPECIFIC EMBODIMENTS

FIG. 1 presents a flow chart demonstrating a method 100 of plugging a selected zone in a subsurface formation, in one embodiment. The method 100 employs a specially formulated waxy emulsion that is designed for injection into a hydrocarbon-bearing reservoir to plug the selected zone. Such zones are typically regions of high water or high gas saturation that may adversely affect fluid sweep and/or hydrocarbon recovery. In one aspect, the zone is one of high permeability that is acting as a "thief" zone.

The method 100 disclosed herein involves injecting a waxy emulsion specially designed so that it may be pumped as a liquid into a wellbore, where it then penetrates and invades a high permeability region in a reservoir or target (selected) zone to be plugged. After injection and placement, the emulsion cures into a solid, where it achieves high gel strength. In this manner the flow of fluids through the target zone is reduced.

In accordance with the method 100 of FIG. 1, the operator of the reservoir (or a contractor or consultant) first formulates the waxy emulsion. This is shown generally at Box 110. The emulsion is a blend of liquids comprising oil, added wax, and water. An emulsifying agent and solvent may optionally be added. The composition of the emulsion is designed so that the mixture is a liquid above a targeted temperature, but solidifies into a waxy matrix containing water droplets once the emulsion cools to below its melting range. In one aspect, the emulsion is formulated to have a viscosity greater than that of fluids residing within the zone to be plugged. In this way, the injected emulsion efficiently displaces the in situ fluids, thus enhancing the ability to achieve effective plugging.

In one embodiment of the present invention, the plugging method 100 involves blending the waxy emulsion. This is shown at Box 120. The hydrocarbon phase components (wax, oil, and any added diluent solvent (if desired)) are mixed in a suitable storage tank. Alternatively, separate supply tanks of the wax, oil, and solvent may be used, and the components continuously mixed in-line during injection, so that the desired final composition is maintained within specifications. To blend the emulsion, the hydrocarbon mixture may be blended and sheared together with any emulsifying agent and the selected volume ratio of water in a suitable mixing device such as an in-line blender.

During storage of liquids and subsequent mixing, the tanks and surface flow lines are preferably heated and insulated to maintain the temperature of the liquids. Preferably, the temperature of the liquids is maintained at approximately 20° C. to 80° C. above the melting range of the waxy emulsion. The emulsion can then be mixed on the surface using pre-heated fluids. The emulsion may optionally be further heated after mixing. Thus, blending 120 includes any heating process for obtaining a temperature of the final emulsion blend that is above the melting range of the emulsion. Preferably, the emulsion is heated to a temperature that delivers the fluid to the downhole injection interval at a temperature of 20° C. to 40° C. higher than the reservoir temperature. This temperature can be denoted as $T_{itz}$. For example, $T_{itz}=T_{res}+(20$ to $40°$ C.).

It may be desirable to also heat the wellbore before injecting the waxy emulsion into the reservoir. An optional wellbore heating is shown at Box 130. Heating may be accomplished by circulating heated oil, such as crude oil, through the injection string and back up the annulus. Depending upon the injection well completion design and its temperature profile from surface to reservoir depth, hot oil may also be injected into a portion of the reservoir prior to injecting the emulsion. This raises both the wellbore and reservoir temperatures to above the melting range of the emulsion. This helps prevent premature cooling and solidification of the emulsion.

After sufficient heating of the waxy emulsion and, optionally, the wellbore, the emulsion is injected into the wellbore and surrounding reservoir. The emulsion is injected as a heated liquid wherein the hydrocarbon phase contains a wax component. This is indicated by Box 140. Upon injection, the emulsion follows the path of least resistance into the selected zone or the region of high permeability to be plugged.

During the injection in Box 140, sufficient waxy emulsion volume is injected to reach a radius of investigation desired to fill the high permeability zone to be plugged or the estimated void volume. The preferred injection mode is to inject the waxy emulsion as fast as possible without exceeding the formation fracture pressure until the desired volume is injected. Injecting at slower rates results in less invasion due to decreasing fluid mobility and increasing flow resistance caused by the formation of a wax structure in the emulsion as the temperature cools into and below its melting range. Because the emulsion is a heated liquid, injection pressure during the injection in Box 140 may not rise significantly above the reservoir pressure ($P_{res}$).

In the recovery of hydrocarbon fluids from reservoirs, the permeability distribution, both vertically and horizontally, within the porous rock can have a substantial impact. In oil recovery processes that involve the injection of a displacing fluid in injection wells to mobilize and push the oil to a producing well (secondary or tertiary recovery), if even a small fraction of the total vertical pay thickness has a permeability significantly greater than the average, that small fraction of pay can divert a large fraction of the displacing fluid through that zone. Through the injection in Box 140, channels or wormholes and other areas of high permeability are filled to remediate this problem.

Following injection of the waxy emulsion, a small volume of fluid may be injected to displace the tubing volume from surface to the injection depth. This displacement is shown at Box 150 of FIG. 1. The fluid is injected to displace any emulsion within the injection string that may solidify and plug the string following shut down. The fluid is preferably heated oil, such as crude oil.

After the displacement in Box 150, the wellbore is allowed to cool. The purpose is to cure the waxy emulsion in situ. This curing is shown in Box 160. Curing 160 is preferably accomplished by shutting in the well. The well should remain shut in for a period of time estimated from experimental data and computations to be sufficient to allow the injected emulsion within the reservoir to cool to below its melting range and reach the desired gel strength. The operator should determine the period for curing based upon the anticipated temperature profile of the reservoir and the expected rate of cooling of the injected emulsion from the wellhead to the target depth of the selected high permeability zone.

The curing time in Box 160 may vary, depending upon several factors, such as the difference between the reservoir temperature and the temperature of the injected waxy emulsion, the volume of fluid injected, and the available time for shut down of operations. However, a typical shut in period is 3 to 7 days.

Once in place within the selected zone, the waxy emulsion cools to a temperature below its melting range. Upon cooling below the melting range, the external hydrocarbon phase surrounding the water droplets within the emulsion solidifies, forming a plug. The solidified emulsion subsequently prevents the flow of fluids through the high permeability zone when subjected to pressure gradients incurred during normal reservoir operations.

Following curing in Box 160, the operator preferably circulates a heated cleaning fluid. This is represented by Box 170. The cleaning fluid may be oil or an emulsion of oil, water, and perhaps, solvent. Alternatively, only a solvent could be used. Kerosene, VARSOL™, or other middle distillates, preferably containing some aromatic components, may be used. The heated fluid serves to melt and clean out any solidified plugging agent remaining within the wellbore or near the wellbore. The heated cleaning fluid is circulated through a working string such as coiled tubing and back up the annulus until flow is re-established in the normal pay zone. The wellhead pressure may be monitored during circulation of the heated cleaning fluid, and the injection and return flow rates may be measured to determine when the unwanted plugging agent has been removed.

During circulation in Box 170, some plugging agent may be returned to the surface. The used waxy emulsion is collected for either recovery or disposal. The well is then ready for normal operation. Frequently, if the well is a producing well, no near-wellbore remediation is necessary following the emulsion treatment. Placing the well on production can remove near-wellbore plugging.

Figure 2:
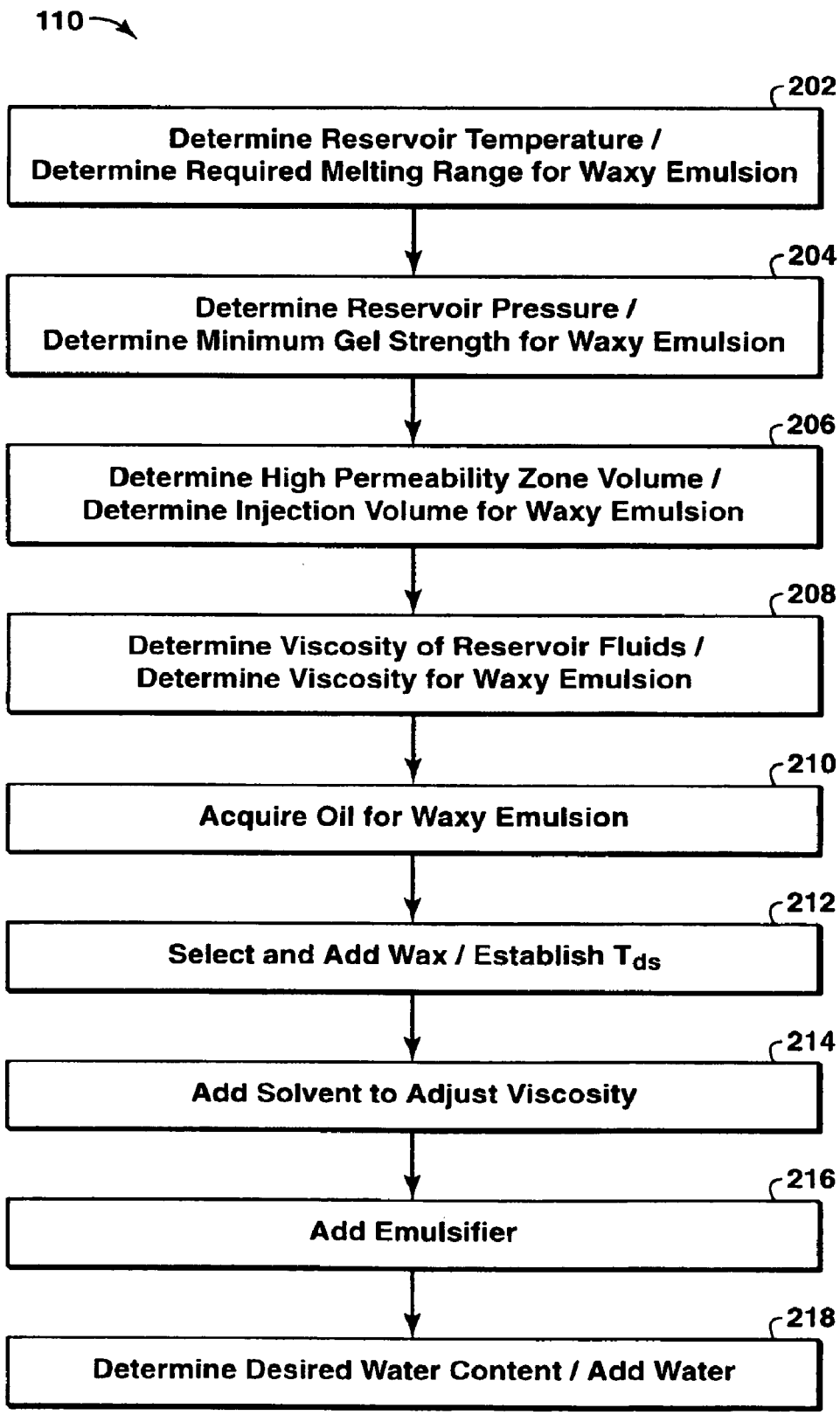
FIG. 2 is a flow chart illustrating a process for formulating a waxy emulsion to be used in the method of FIG. 1, in one embodiment.

To operate in this manner, various reservoir characteristics and fluid factors are simultaneously considered. FIG. 2 illustrates a flow chart listing these characteristics and factors. This chart collectively represents the formulation in Box 110. It is understood that not all of the procedures discussed in FIG. 2 have to be performed for a successful plugging operation. It is further understood that the procedures may not be conducted in the order shown.

Referring now to FIG. 2, the reservoir temperature is determined. This is represented by Box 202. As explained more fully below, the purpose of Box 202 is to determine the required melting range for the waxy emulsion. The reservoir temperature may be denoted as $T_{res}$. The reservoir temperature is the temperature of fluids resident within a formation. This is distinguished from the operating temperature of the formation. In this latter respect, it is noted that in some instances heated fluids may be injected into an injection well to not only sweep or drive production fluids towards a production well, but also to warm the fluids resident in the formation to lower the viscosity and aid in fluid recovery. This becomes the operating temperature of the formation. The operator or program accounts for this difference in temperature when determining the required melting range for the waxy oil-external emulsion.

Next, at Box 204 the operator may also determine the pressure range within the reservoir or zone to determine what pressures are exerted upon the waxy emulsion remotely from the wellbore. The pressure of the reservoir to be plugged may be denoted as $P_{res}$. A minimum gel strength required for the emulsion is deduced from the pressure gradient existing around a production well and any adjacent injection wells.

The operator should also consider the volume of the high permeability zone to be plugged. This determines the desired amount of waxy oil-external emulsion to be injected into the selected zone, as demonstrated at Box 206. Sufficient emulsion volume is injected to reach a desired radius of investigation to fill the high permeability region or to fill at least a portion of the estimated void volume. An estimate of the volume of the selected zone to be plugged and an estimate of the radial distance from the wellbore to be treated can be determined by reservoir engineers using any combination of pressure transient falloff tests, injection and production tests using fluids tagged with tracers, and computer simulations. The operator injects the desired volume of emulsion, plus a volume sufficient to fill the injection tubing (or working string, as the case may be).

Next, the viscosity of the various reservoir fluids may be determined. This is represented by Box 208. The viscosity of the in situ oil at reservoir conditions may be denoted as $\mu_o$, while the viscosity of existing brine at reservoir conditions may be denoted as $\mu_w$. The purpose of this viscosity determination is to determine a desired viscosity for the waxy emulsion. As will be more fully explained below, the viscosity of the emulsion should be similar to and, preferably, greater than that of the resident fluids. Thus, it is desirable to blend an emulsion that can be injected into a wellbore to displace fluids residing in a high permeability region of a hydrocarbon reservoir with the objective of plugging that zone to the subsequent flow of fluids.

The operator next acquires oil for the waxy emulsion. This is shown by Box 210. The oil is preferably crude oil. However, the oil can be any oil that, when mixed with wax, makes a mixture that emulsifies with water in the presence of an emulsifying agent. For ease of acquisition and reduced cost, locally produced crude oil is a good choice. The produced crude oil may already contain some non-separated water. The oil may be blended and/or emulsified to ensure substantially consistent properties of viscosity and water content. The water content should be taken into consideration when calculating the oil content in wax-oil mixtures.

At Box 212, the operator preferably adds a wax to the emulsion. It is noted that in some produced crude oils, paraffins or other waxes may already be present in the production stream. However, such wax content may not be enough to cause a solidification of the emulsion at the anticipated operating temperature. Therefore, the wax may be at least in part a wax additive or added wax.

The added wax can be selected from a wide range of waxes that are soluble in oil. Examples include petroleum-derived waxes, such as paraffins, or non-petroleum natural waxes, such as beeswax or vegetable wax. Numerous suppliers offer paraffin and non-paraffin containing hydrocarbon-based wax stocks that could be utilized in the current processes. One preferred source for wax is Imperial Oil Limited. The Imperial Oil Slack Wax product line provides various waxes with a broad range of melting points and physical characteristics for use as blending components.

Most commercially available waxes are not pure components, but mixtures of different molecules containing a wide range of molecular weights and individual melting ranges. However, commercially available waxes are blended so that the product consistently has a melting range falling within stated specifications. Table 1 shows several wax products offered by Imperial Oil, along with some of the physical properties of each.

TABLE 1

Typical Properties of Imperial Oil Slack Waxes

| | WAX 1005 | WAX 1010 | WAX 1008 | WAX 1775 | WAX 1020 | WAX 778 | WAX 1834 | WAX 1718 |
|---|---|---|---|---|---|---|---|---|
| Congealing Point, ° C. | 48.9 | 51 | 52 | 54.5 | 60.4 | 63.6 | 66.1 | 72.8 |
| Oil Content, wt. % (D721) | 9 | 7.6 | 8.3 | — | 13.2 | — | — | — |
| Oil Content, wt. % (D1325) | — | — | — | 11.3 | — | 15.8 | 17.9 | 19.9 |
| Kinematic Viscosity, cSt at 100° C. | 3.24 | 3.62 | 3.84 | 3.95 | 6.49 | 7.27 | 8.91 | 12.3 |
| N-Paraffin Content, wt. % | 71 | 70 | 42 | 53 | — | 35 | 30 | 16 |

The composition of the wax-oil mixture is chosen so that the waxy oil-external emulsion is liquid above a targeted temperature, but solidifies once the emulsion cools to below its solidification point. Two variables generally determine the melting range of the hydrocarbon phase of the injected emulsion. These are the fraction of wax included and the melting range of the individual wax component. A wax is selected that has a congealing point (the highest temperature of the melting range) sufficiently high so that mixtures of approximately one-half wax and one-half oil have a melting range lower than the injection temperature (denoted as $T_{itz}$), but higher than the desired stable operating temperature (defined below as $T_{ds}$).

Selecting and adding wax at Box 212 depends upon the reservoir temperature determined at Box 202. The wax-oil mixture should preferably have a congealing point of approximately 20° C. to about 80° C. above $T_{res}$. The reason for this specification is to ensure that as the waxy emulsion is injected into the wellbore and into the selected zone, the emulsion retains a temperature above its melting range while flowing until it reaches the location where plugging is desired.

The operator should also consider the solidification point (the lowest temperature of the melting range) of the mixture as part of Box 212. A desired stable operating temperature for the solidified waxy emulsion should be established, which may be denoted as $T_{ds}$. This is the anticipated maximum temperature to which the solidified emulsion plug is exposed after placement during normal reservoir operations. $T_{ds}$, of course, is below $T_{itz}$ and may be higher than $T_{res}$. The solidification point should be at or above $T_{ds}$.

A number of different combinations of oil and wax may be used that provide the same melting range. A wax having a higher melting range generally requires a higher dilution with oil in a wax-oil mixture to produce the same melting range as a wax having a lower melting range when mixed with the same oil. No singularly desired volume or weight percentage exists for the wax content of the waxy emulsion. Wax content may vary depending upon the melting range, the gravity of the oil, and the possible presence of paraffin in the oil used.

The operator may desire to prepare a set of wax-oil mixtures for testing, where the various candidates have different fractions of wax and oil. The operator measures the melting range of each mixture. The melting range can be determined by placing a sample of the mixture in a temperature controlled water bath and varying the temperature to determine the melting range by visual observation. Alternatively, other methods can be used to determine the melting range, such as the use of a precision differential scanning calorimeter or measurement of viscosity versus temperature in a rheometer.

In one manner of formulation under Box 110, a series of mixtures of a selected wax and oil are prepared. The melting range of each mixture is empirically measured. The preferred method for measuring the melting range is to measure viscosity versus temperature in a rheometer, such as the Viscoanalyzer VAR 100™ manufactured by Reologica Instruments, or the HBDV-III viscometer, manufactured by Brookfield Instruments. The melted sample is placed in the instrument at a temperature above the melting range, and the viscosity is measured versus shear rate for a series of decreasing temperatures. As the temperature drops below the upper bound of the melting range, the viscosity of the wax-oil mixture increases dramatically.

A less preferred, but generally adequate method for determining melting range is to place a sample of the melted wax-oil mixture into a temperature controlled water bath, so that the mixture is initially fully melted. The temperature is then slowly reduced, and visual observations are made of the temperature at which wax crystals first form (the highest temperature of the melting range) and the temperature at which the sample becomes solid (the lowest temperature of the melting range). Based on these tests, a mixture of wax and oil is selected which has a melting range sufficiently above $T_{ds}$.

The measured value of the lowest temperature of the melting range, that is the temperature at which solidification occurs, may vary depending upon the method used. For example, a scanning differential calorimeter often reveals a lower solidification temperature than visual or rheometric measurements. However, for purposes of applying the plugging method 100, precise measurement of the solidification point is not required. Measuring the temperature at which wax crystals are first noted (e.g. the upper bound of the melting range) is sufficient, and the fluid composition is designed and the injection temperature is controlled based on that temperature. While the waxy emulsion can continue to be injected and flow through porous rock at temperatures below this upper temperature limit of the melting range, designing the system so that this limit is not reached by the fluid prior to entering the selected zone ensures that the process is effective.

If a viscous, heavy crude oil is chosen as the oil, it may be desirable to add a solvent to the emulsion. This option is shown in FIG. 2 at Box 214. If the oil selected for the emulsion has a viscosity greater than the viscosity of the reservoir oil ($\mu_o$), a solvent such as VARSOL™ or kerosene may be added to the oil to reduce its viscosity to approximately $\mu_o$. The addition of diluent solvent reduces the hydrocarbon phase viscosity. This, in turn, reduces the viscosity of the injected emulsion, because the viscosity of the emulsion is primarily controlled by the viscosity of the external hydrocarbon phase.

Adding solvent allows the operator to adjust the viscosity of the emulsion for ease of injection into a high permeability zone. Different solvents may be used to reduce the viscosity of the emulsion. Examples include kerosene and VARSOL™. VARSOL™ is a product of Imperial Oil Limited. VARSOL™ (a refined middle distillate) is commercially used for automotive cleaning to remove oil and grease. It is also used for thinning oil-based paints, varnishes, and polyurethanes.

Depending on the composition of the wax-oil mixture, changes in viscosity and melting range due to the addition of solvent may or may not be significant. Empirical measurements can be made on mixtures to determine the impact of diluent solvent addition. By making measurements of viscosity and melting range for various possible mixtures, the operator can choose a composition that meets the desired viscosity and melting range. Preferably, the actual target viscosity of the hydrocarbon blend is chosen so that when a waxy emulsion is made containing about 40 to about 60 volume % of water, the emulsion has a viscosity about 1.25 to about 3 times greater than that of the fluids residing within the selected zone to be plugged. This ensures that the emulsion has a favorable mobility ratio displacement of the fluid existing within the high permeability zone to be plugged, while still maintaining a viscosity low enough to be injected easily. Such a favorable mobility fluid more effectively displaces the resident fluid and achieves a more uniform plug that better conforms to the volume distribution of the high permeability zone after cooling.

In addition to a solvent, the operator may optionally choose to add an emulsifying agent. The addition of the emulsifier is shown in FIG. 2 at Box 216. Surfactants can be used as emulsifying agents. The surfactants may be either ionic or non-ionic. If surfactants are used, the surfactant type and concentration should be chosen so that the mixture forms an oil-external emulsion with water droplets having diameters of about 1 to about 10 microns. Water droplets with larger diameters tend to be less stable and may rupture during injection into the reservoir. Therefore, they are not recommended.

If the oil chosen in Box 210 contains sufficient polar hydrocarbons (asphaltenes, naphthenic acids, or other polar species, such as commonly found in heavy oil or bitumen), submicron-size mineral fines can be used for stabilizing the emulsion. Examples of such fine mineral solids include fumed silica and divided bentonite. Use of fine mineral solids at concentrations of about 0.5 to about 1.0 g/L of solids in emulsion produces a water-in-oil emulsion containing water droplets with diameters of about 1 to about 10 microns.

Acceptable emulsifying agents are not limited to only fine mineral solids or surfactants. Any pH modifying agent (including, but not limited, to metal hydroxides) or other agent that favors the formation and stabilization of oil-external water-in-oil emulsions with the hydrocarbon blend can be used as the emulsifying agent for Box 216.

The operator may also determine a desired water content for the waxy emulsion as presented by Box 218. By definition, the emulsion includes not only oil, but at least some water. The emulsion formed is a water-in-oil emulsion. Water is desirable in the emulsion for several reasons. First, including water in the injected fluid significantly reduces the cost per volume of the fluid, because water is significantly less expensive than oil or other additives. Second, the water, included as internal droplets in an oil-external emulsion, produces a fluid which has significantly higher viscosity than that of either the individual oil or water phases. The viscosity of the emulsion may be adjusted by varying the water content. Therefore, the resulting emulsion can be designed to have favorable mobility displacement of either oil or water in the zone to be treated. Third, the presence of water increases the heat capacity of the injected fluid, allowing the injected fluid to retain heat for a longer period compared to a single-phase wax. Because water has a higher specific heat capacity than oil, including water as the internal phase allows the injected fluid to have a greater heat capacity. This also allows the injected fluid to cool more slowly and penetrate into the reservoir farther than if oil were the sole phase injected.

In the preferred embodiment of Box 218, the water content of the injected waxy emulsion is set to about 40 to about 60 volume % to minimize the cost of wax and oil. Up to 60 volume % of water can usually be incorporated in such emulsions with ease. Lower percentages of water can be included in the emulsion if greater gel strength is desired in the solidified emulsion.

The oil source for the waxy emulsion may already contain some water. When water is present in the oil, the water content should be measured and taken into consideration when calculating the total water content in the final emulsion. In any case, coreflood tests of the proposed emulsion can be conducted and the gel strength measured to ensure that it meets the desired flow resistance during normal reservoir operations in accordance with Box 204.

Once the final composition for the waxy emulsion is established, it is preferred that additional laboratory tests be conducted to provide additional data for improving predictions of flow of the emulsion during injection and placement within the reservoir. For example, coreflood tests can be conducted in which the emulsion is injected into a core at a fixed temperature, simulating flow into the reservoir at that temperature. Cores having permeability representative of the selected zone can be used to measure pressure drops and fluid mobility as a function of temperature. Similar corefloods can be conducted using cores having permeability representative of the normal formation rock. Comparison of the fluid mobility in both types of rocks can be used together with a geological description of the total pay thickness to estimate the fractions of injected emulsion that are diverted into the selected zone and into normal rock near-wellbore. This also allows computation of the estimated depth of penetration in each zone as a function of the total volume of emulsion injected.

Using a rheometer, the viscosity of the waxy emulsion can be measured as a function of shear rate and temperature. The viscosity is measured versus shear rate at each temperature for a range of shear rates, providing data to use in predicting mobility during injection into the selected zone.

Laboratory tests may also be conducted to confirm that the chosen composition has sufficient gel strength to provide flow resistance within the high permeability zone after cooling and solidification. Following injection of the waxy emulsion into the cores, the cores can be allowed to cool to a desired temperature. The desired temperature is preferably close to the anticipated operating temperature of the formation. Flow tests can be conducted in each sample to determine the pressure gradient needed to cause flow of oil or water through the cores. This pressure gradient can be used as an estimate of the gel strength achieved after cooling. By comparing the measured pressure gradient needed to cause flow to the maximum pressure gradient expected within the reservoir during normal reservoir operations, an operator may be able to determine whether the gel strength achieved with the emulsion composition is sufficient to provide the flow resistance desired.

As a general guideline, if the gel strength is too low, the fraction of wax included in the hydrocarbon phase can be increased. While this also generally increases the melting range and, thus, requires higher temperatures during injection, the composition can be optimized to simultaneously meet constraints of gel strength and injection temperature.

The method described in Box 110 of FIG. 1 and set forth in the process of FIG. 2 allows the injection of a waxy emulsion in liquid form to achieve deep penetration into selected zones at large distances from the wellbore. The method of Box 110 also provides for adjusting the fluid viscosity during injection by changing the solvent or water content to provide favorable mobility displacement of fluids residing in the selected zone during placement. Because of the presence of added wax in the emulsion, the emulsion has a melting range that is above a targeted temperature. Thus, after a period of curing, a solidified plug is created that can provide an efficient barrier to subsequent flow of fluids through the filled zone.

Figure 3:
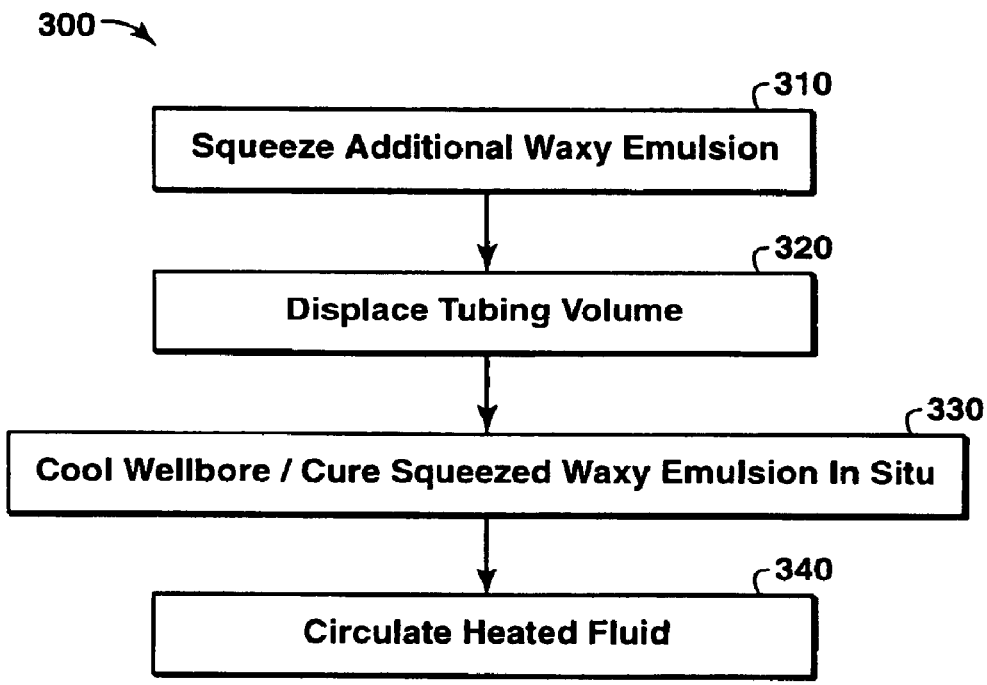
FIG. 3 is a flow chart illustrating a process for plugging a high permeability zone in addition to those of FIG. 1, in one embodiment.

In an alternate embodiment of the invention, one or more additional injections of the waxy emulsion are made after curing in Box 160 in FIG. 1. The injections are referred to as "squeezes." The injection in Box 140, displacement in Box 150, cooling in Box 160, and circulating in Box 170 in FIG. 1 together may be designated as the first squeeze. FIG. 3 provides a flow chart demonstrating the method 300 for an additional squeeze. Preferably, two or more additional squeezes 300 of the waxy emulsion are conducted sequentially to effectively plug the high permeability zone.

Following the cooling period in Box 160 and, optionally, the circulating in Box 170 in FIG. 1, another volume of waxy emulsion is injected, as shown in FIG. 3 at Box 310. Injection in Box 310 is intended to fill any voids remaining after the first injection in Box 140 in FIG. 1 and to fill additional high permeability pathways not contacted by the first injection. Injection pressure during the additional injection in Box 310 typically rises significantly above that observed during the first injection in Box 140. Injection can be continued until a sufficiently high pressure is reached or the desired additional volume is injected. Again, the injection pressure should not exceed the fracture pressure for the formation.

The terminal pressure should be held for several hours by shutting in the injection well, allowing the pressure to partly decline, and then refilling the injection string with additional waxy oil-external emulsion to maintain an elevated pressure on the squeeze. After the rate of pressure decline has slowed, indicating that the emulsion is beginning to solidify and provide more flow resistance, a small volume of oil may be injected to just displace the tubing volume from surface to the injection depth. This is represented by Box 320. The well is again shut in to allow the emulsion to cool and solidify. This is shown at Box 330.

After waiting for the requisite cooling period based on experimental data or computations of the rate of cooling within the formation, the sequence of a squeeze in Boxes 310-330 may be repeated. Such sequences are repeated for a total of three or more squeezes or until the selected zone effectively takes no more fluid during the final squeeze. In the latter case, the well pressure immediately rises to near the fracture point without taking a significant volume of additional waxy oil-external emulsion, and the squeeze procedure is complete. The formation is allowed to cool for several days, depending upon the operator's thermal computations or estimates, to allow the emulsion to solidify and gain gel strength.

After the final waxy emulsion injection, a cleanup operation may be conducted. This is in accordance with Box 340. As with the circulation of heated fluid in Box 170 in FIG. 1, heated oil or solvent is circulated through the wellbore to remove solidified plugging agent in and near the wellbore.

Another aspect of the present invention relates to the removal of the solidified waxy emulsion. When the waxy emulsion is placed in a selected subsurface zone, such as a high permeability zone, and solidified, the solidification process can later be reversed by subsequently heating the wellbore and surrounding formation to a temperature above the emulsion's melting range. Thus, even in the absence of an ability to inject hot fluids initially, heating of the wellbore by the circulation of hot fluids can melt the emulsion and restore flow into affected regions that are desired to be restored to or near their original permeability.

Figure 4:
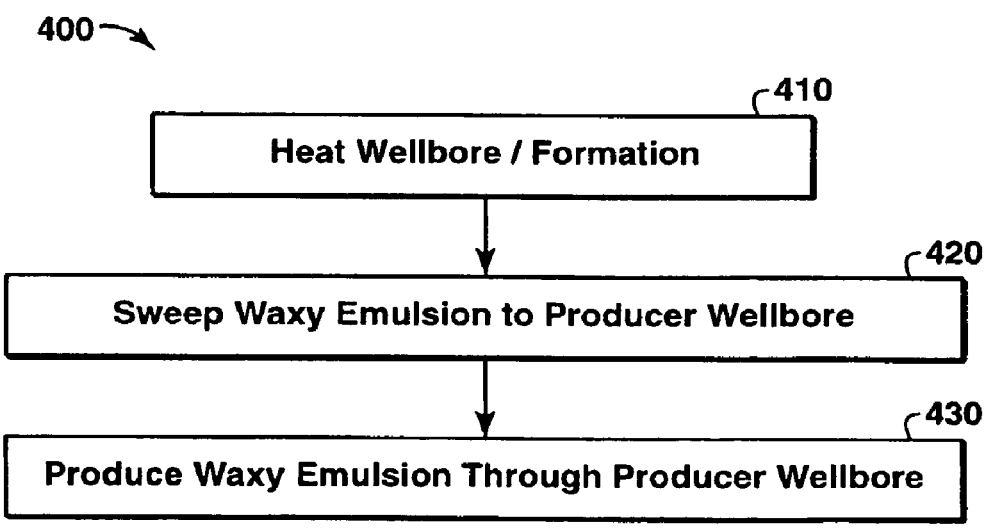
FIG. 4 is a flow chart showing additional procedures that may be performed to remove a solidified plug that has been set in a reservoir, in one embodiment.

FIG. 4 provides a flow chart demonstrating this aspect of the invention. In this embodiment, a high permeability zone in a reservoir has previously been plugged with a solidified waxy emulsion. To remove the emulsion, the wellbore and surrounding formation are heated. This is shown by Box 410. Heat transfer can be accomplished by convection with fluid flow into the solidified emulsion or, if no flow can be established, by thermal conduction from the wellbore to the solidified emulsion.

Once thermal energy has liquefied the waxy emulsion, the emulsion may be produced through the wellbore. In one embodiment, the emulsion may be flowed or swept towards a production well by injecting a displacing fluid through an injection well. This is shown in Box 420. However, where reservoir pressure is adequate, production of the liquefied emulsion may be accomplished without injecting displacing fluids. In either event, production of the waxy emulsion through the producer wellbore is shown by Box 430.

EXAMPLES

Example 1

Laboratory Demonstration

As a demonstration of the concepts disclosed above, a series of tests were conducted. In the tests, a maximum operating temperature of 25° C. was assumed for a thief zone (e.g. a "selected zone") after treatment. A maximum pressure gradient of approximately 25 psi/ft was also anticipated. Therefore, a waxy emulsion was formulated to meet these conditions. The emulsion may be referred to herein as a waxy-SSE (solids-stabilized emulsion).

In designing a waxy emulsion to plug a thief zone, a series of possible compositions were prepared. The compositions included oil, wax, solvent, and water. The compositions were tested to determine which best satisfied the melting range, viscosity for injection, and minimum gel strength after solidification.

In formulating the waxy-SSE, an oil and wax were selected. For the oil, a dead (non-pressurized) heavy crude oil was used. Crude oil produced from the reservoir was selected as the oil, because it was locally available and the least expensive option. The oil had a viscosity of approximately 5,000 cp at a reservoir temperature of 18° C.

Because the design temperature for stability of the waxy-SSE after solidification ($T_{ds}$) was about 25° C., several waxes, which are shown in Table 1 above, were considered as candidates. Each of the candidates had congealing points within the range of approximately 20° C. to 80° C. above $T_{ds}$. Imperial Wax 1010 was chosen for each composition. Mixtures of the oil and Imperial Wax 1010 were prepared, and the melting range was observed for each as shown in Table 2. In addition to hydrocarbon mixtures containing only wax and crude oil, mixtures that contained VARSOL™ 3139 were also prepared to determine the effect of adding low-viscosity diluent on the mixture melting range and viscosity.

TABLE 2

Wax Appearance Test for Wax-Oil-VARSOL ™ Blends Based on Visual Observations in Controlled Temperature Bath

| Temp. (° C.) | 40 wt. % Wax/ 60 wt. % Oil | 45 wt. % Wax/ 55 wt. % Oil | 50 wt. % Wax/ 50 wt. % Oil | 40 wt. % Wax/ 30 wt. % Oil/ 30 wt. % VARSOL ™ | 40 wt. % Wax/ 25 wt. % Oil/ 35 wt. % VARSOL ™ | 40 wt. % Wax/ 20 wt. % Oil/ 40 wt. % VARSOL ™ |
|---|---|---|---|---|---|---|
| 54 | Clear | Clear | Clear | Clear | Clear | Clear |
| 52 | Clear | Clear | Clear | Clear | Clear | Clear |
| 50.1 | Clear | Clear | Clear | Clear | Clear | Clear |
| 48 | Clear | Clear | Clear | Clear | Clear | Clear |
| 45.9 | Clear | Clear | Clear | Clear | Clear | Clear |
| 44 | Clear | Clear | Partial Skin | Clear | Clear | Clear |
| 41.9 | Clear | Partial Skin | Full Skin | Clear | Clear | Clear |
| 40.2 | Partial Skin | Full Skin | Soft Dimple | Clear | Clear | Clear |
| 38.2 | Full Skin | Hard | Hard | Partial Skin | Partial Skin | Partial Skin |
| 35.9 | Soft Dimple | — | — | Full Skin | Full Skin | Full Skin |
| 33.9 | Hard | — | — | Soft Dimple | Full Skin | Full Skin |
| 31.9 | — | — | — | Hard | Soft Dimple | Full Skin |
| 29.9 | — | — | — | — | Hard | Soft Dimple |
| 28.2 | — | — | — | — | — | Hard |

In the left three columns of Table 2, no solvent was added to the wax-oil mixture; however, the wax concentration was progressively increased from 40 wt. % to 45 wt. % and finally to 50 wt. %. As the wax concentration increased, the congealing point of the mixture also increased. The congealing point for the 50 wt. % wax concentration mixture was 45.9° C., while the congealing point for the 40 wt. % wax concentration mixture was only 41.9° C.

Also, the right three columns of Table 2 demonstrate that the solvent concentration had little effect on the melting range. The solvent concentration was progressively increased from 30 wt. % to 35 wt. % and finally to 40 wt. %, while the wax concentration was constant at 40 wt. %. The congealing point for all three mixtures was 40.2° C. However, a small difference existed between the solidification points. As the solvent concentration increased, the solidification point of the mixture decreased. The solidification point for the 40 wt. % solvent concentration was about 4° C. lower than the solidification point for the 30 wt. % solvent mixture.

Figure 5:
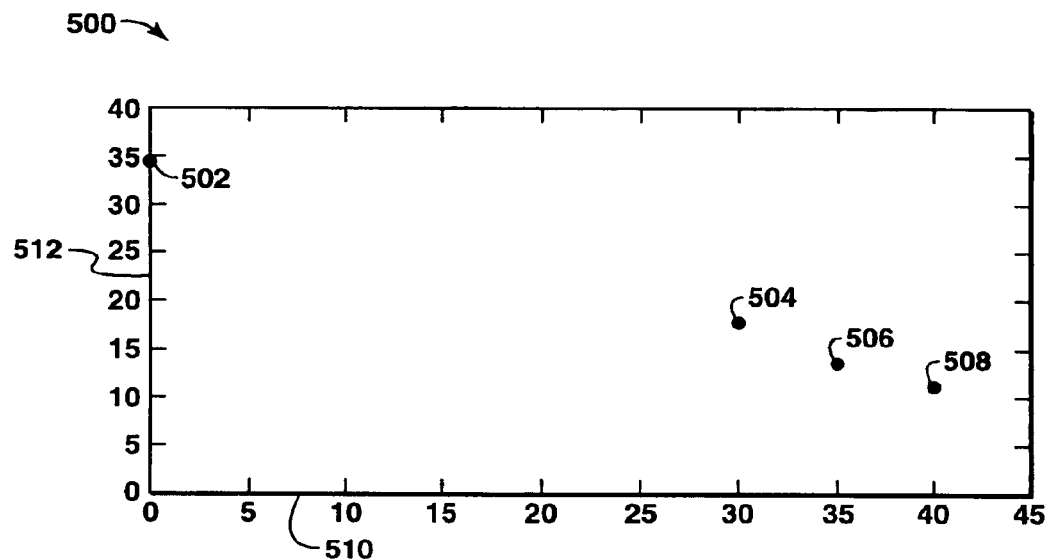
FIG. 5 is a graph comparing the concentration of solvent to the viscosity of a wax-oil-solvent blend.

If the selected oil has a viscosity greater than the viscosity of the reservoir oil ($\mu_o$), solvent such as VARSOL™ or kerosene may be added to the oil to reduce its viscosity to approximately $\mu_o$. FIG. 5 demonstrates how the concentration of solvent changed the viscosity of one of the wax-crude oil-solvent mixtures. A graph 500 is presented in FIG. 5. In the graph 500, the concentration of solvent 510 is shown on the x-axis from 0 to 45 wt. %. The viscosity of the mixture 512, measured in cp, is plotted on the y-axis against the concentration of solvent. The range on the y-axis is 0 to 40 cp. The oil used in the blend was crude oil with a viscosity of 5,000 cp, while the wax was Imperial Oil Wax 1010. The solvent used in these tests was VARSOL™ 3139. The wax content was 40 wt. %. The temperature was held constant at 40° C. during the tests.

In graph 500, the initial viscosity of the mixture with 0 wt. % solvent was nearly 35 cp. This is shown as data point 502. As the concentration of solvent 510 increased, the viscosity of the wax-crude oil-solvent blend 512 decreased. This is demonstrated through intermediate data points 504 and 506. Once the solvent concentration 510 reached about 40 wt. %, the viscosity was reduced to around 11 cp. This is shown as data point 508. Because the viscosity of the melted wax was less than 1 cp, the wax alone imparted sufficient reduction in viscosity to provide a low-viscosity mixture without the need for additional diluent. A low-viscosity diluent may be added for other reasons, explained below, without adversely affecting the melted mixture viscosity.

The final hydrocarbon phase composition was chosen to contain 40 wt. % added wax, 48 wt. % crude oil, 11.5 wt. % VARSOL™ 3139, and 0.5 wt % NORPAR™ 15. NORPAR™ 15 is a product of ExxonMobil Chemical Company. NORPAR™ 15 is a refined, highly paraffinic distillate used here as a hydrocarbon phase tracer. The NORPAR™ 15 tracer was an inert component of the waxy emulsion included to assist in analyzing the composition of the coreflood effluent after the gel strength was exceeded and flow through the core was established. NORPAR™ 15 was also included in the blend to serve as a tracer for detection of the waxy emulsion in produced fluids and as a monitor of plug integrity after the wells were placed back into normal service in the field test described later. The VARSOL™ 3139 was used as a diluent for the NORPAR™ 15 tracer and was a substantially inert component to make the tracer easier to dilute and mix. As shown in Table 2 and graph 500, this small amount of VARSOL™ 3139 solvent did not materially affect either the melting range or viscosity of the blend. It is noted that the desired solvent concentration may depend upon many factors, such as the type of solvent, the reasons for adding the solvent, the viscosity of the oil, the desired viscosity of the emulsion, the wax content, and the desired melting range of the emulsion.

The waxy-SSE was then formulated by blending and shearing an oil-external emulsion containing 60 volume % of the waxy hydrocarbon mixture, 40 volume % of water, and fumed silica solids (Degussa AEROSIL® R972) at a concentration of 0.15 g/L of silica in the emulsion. A Silverson Model L4RT-A laboratory mixer was used to blend the emulsion. The silica solids served as the emulsifying agent to stabilize the resulting oil-external emulsion. Since the particular crude oil that was used contained sufficient polar hydrocarbons, mineral fines provided effective emulsification as taught by Bragg in U.S. Pat. Nos. 5,910,467, 5,855,243, and 6,068,054.

The composition, which is shown in Table 3 below, was chosen for the waxy emulsion because it provides an upper melting point temperature of approximately 40° C. This is 22° C. above the reservoir temperature of 18° C. and 15° C. above the desired stable operating temperature ($T_{ds}$) of 25° C.

TABLE 3

Composition of Selected Waxy Emulsion

| Component | Wt. % |
|---|---|
| Water | 40 |
| Wax | 24 |

TABLE 3-continued

Composition of Selected Waxy Emulsion

| Component | Wt. % |
|---|---|
| Oil | 28.7 |
| VARSOL ™ 3139 | 6.9 |
| NORPAR ™ 15 | 0.3 |
| AEROSIL ® R972 | 0.1 |

Figure 6:
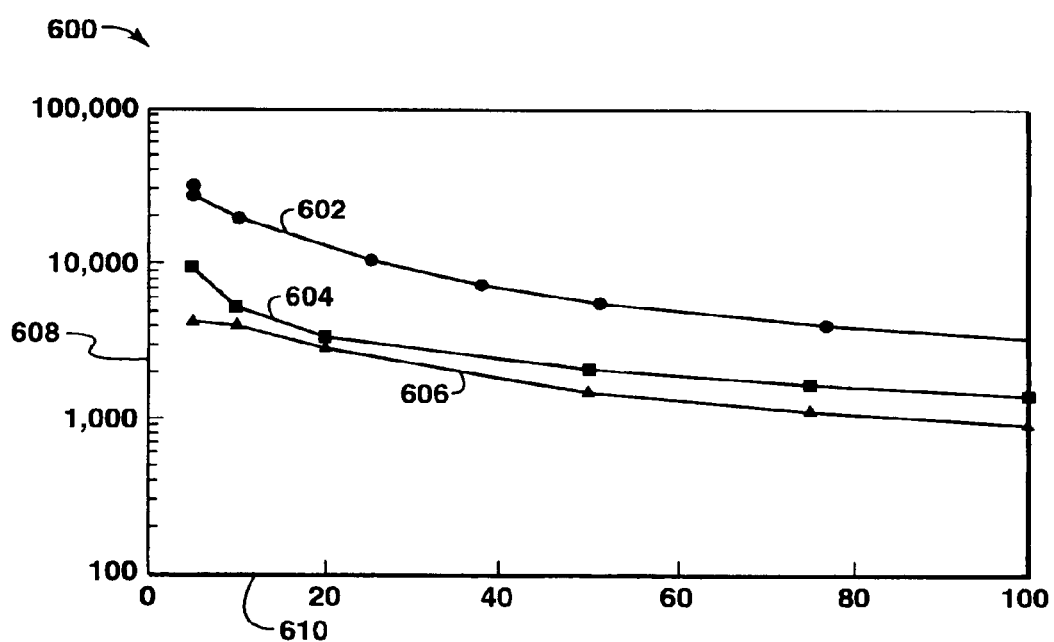
FIG. 6 shows the viscosity of the waxy emulsion as a function of shear rate and temperature.

A graph 600 is presented in FIG. 6. In graph 600, the viscosity of the waxy emulsion 608 was measured as a function of temperature and shear rate 610. Shear rate 610 is plotted on the x-axis of the graph 600 from 0 to 100 s$^{-1}$. Viscosity 608 is shown on the y-axis of the graph 600 on a logarithmic scale from 100 to 100,000 cp. The temperature of the emulsion was held constant at three different temperatures while the viscosity 608 was measured as a function of shear rate 610. Curves are plotted for 30° C. (line 602), 35° C. (line 604), and 40° C. (line 606). The viscosity measurements at the three temperatures can be used to more fully evaluate flow resistance as a function of shear rate. While the waxy emulsion was a non-Newtonian fluid exhibiting shear thinning at any fixed temperature, as any normal water-in-oil emulsion, the viscosity 608 increased significantly as the temperature dropped near the solidification temperature of the waxy emulsion.

The waxy-SSE was designed to be effective after placement and solidification in a thief zone that was exposed to a maximum operating temperature ($T_{ds}$) of 25° C. after treatment and a maximum pressure gradient of approximately 25 psi/ft. To determine if the emulsion met these conditions, coreflood tests were conducted using laboratory cores. Several 1-inch diameter×6-inch long cores were packed with glass beads. The beads were packed to have permeabilities ranging from 150 D to 577 D to simulate a high permeability zone.

Figure 7:
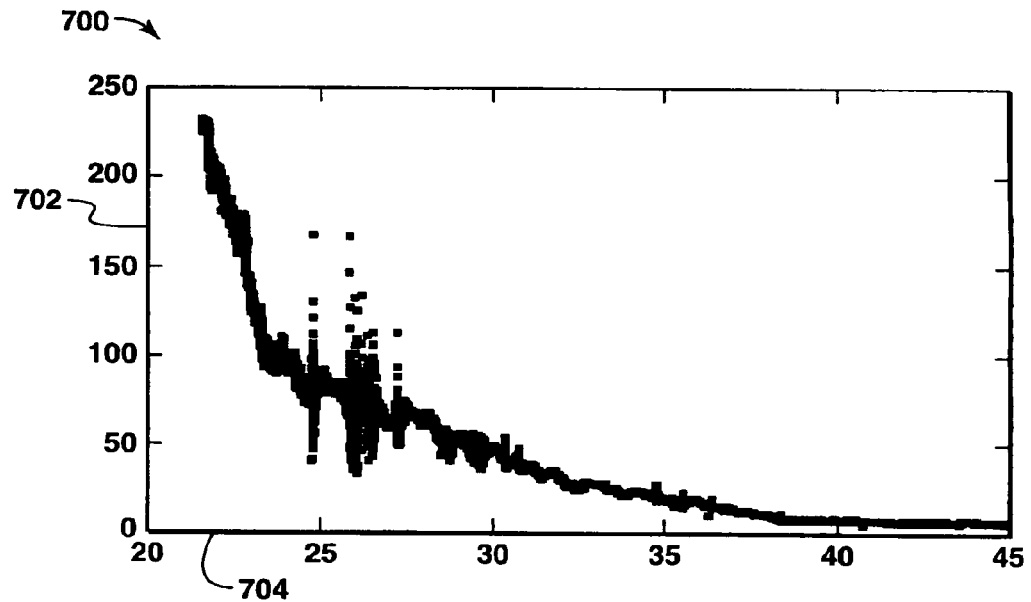
FIG. 7 shows the pressure gradient measured in a 150 Darcy (D) core as a function of temperature.

The melted waxy oil-external emulsion was injected at a constant rate into a 150 D core immersed in a temperature controlled water bath. FIG. 7 presents a graph 700 in which the pressure gradient 702 was measured in the core as a function of temperature 704. Temperature 704 is plotted along the x-axis from 20° C. to 45° C. Along the y-axis, pressure gradient 702 is displayed from 0 to 250 psi/ft. The results show that as long as flow was maintained during the injection process, the emulsion flowed even though the temperature 704 dropped below the upper temperature limit of the melting range.

Figure 8:
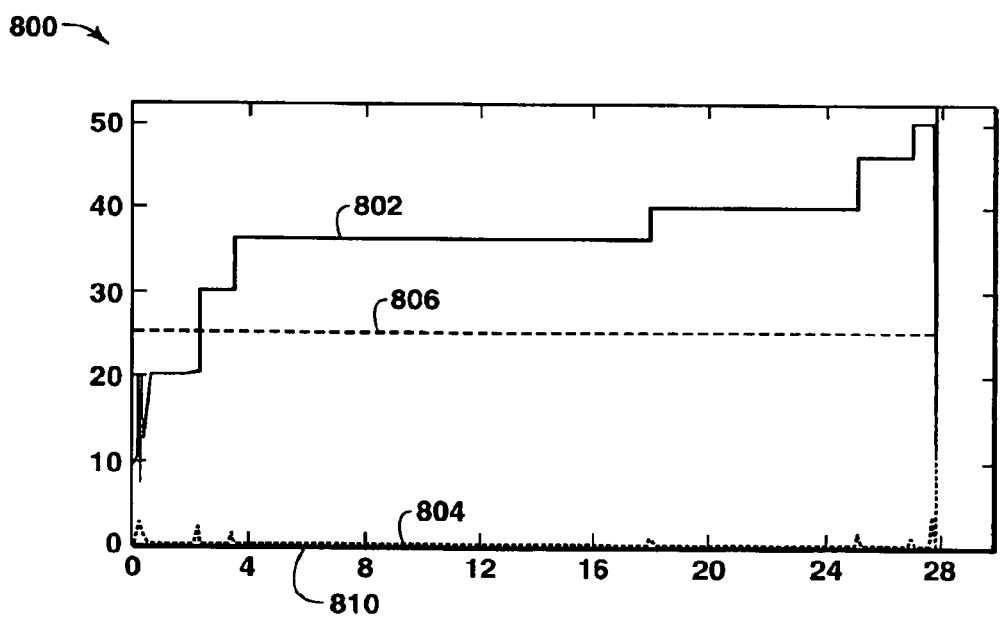
FIG. 8 is a graph representing a gel strength test utilizing the core from FIG. 7.

In a second laboratory test, the gel strength of the waxy oil-external emulsion represented by the pressure gradient that caused flow through a treated core at a controlled temperature was measured. The results are shown in FIG. 8 as graph 800. The core in graph 700 was allowed to cool to 18° C. and sit quiescent for 24 hours prior to testing for gel strength. The core was then placed in a constant temperature bath maintained at 25° C. The inlet of the core was connected to a Quizix model C-5000 laboratory pump containing 2,500 cp oil. Pressure was then applied against the core. The pump was programmed to hold pressure on the core for a specified time interval, and the flow rate was measured. If no flow was detected, the pressure was increased and held constant for the next observation period. This was continued until flow was detected.

Several different parameters from this test are plotted versus time 810 (in hours with a numerical scale on the x-axis) in graph 800. These are applied pressure gradient (measured in psi/ft with a numerical scale on the y-axis and noted as line 802), flow rate (measured in cubic centimeters per minute (cc/min) with a numerical scale on the y-axis and noted as line 804), and core temperature (measured in °C. with a numerical scale on the y-axis and noted as line 806). An initial pressure gradient 802 of 10 psi/ft was applied without causing flow. In this respect, line 804 is flat at 0 cc/min. The pressure gradient was then increased to 20 psi/ft and held for several hours. Still, no flow occurred. The pressure gradient was then increased incrementally to 30, 36, 40, and 46 psi/ft over various time intervals, all without inducing flow. Failure of the plug finally occurred at 50 psi/ft, as shown by the sudden increase in line 804 at 28 hours. In summary, graph 800 shows that flow did not occur until a pressure gradient of 50 psi/ft was reached after 28 hours of cumulative pressure on the core, while the core temperature was maintained at 25° C. The gel strength of the waxy-SSE sample was 50 psi/ft, which corresponds to the pressure differential that the emulsion could withstand in a reservoir in the flowing direction. Therefore, when the emulsion was allowed to sit quiescent for 24 hours before the start of this test, the emulsion gained gel strength.

Figure 9A:
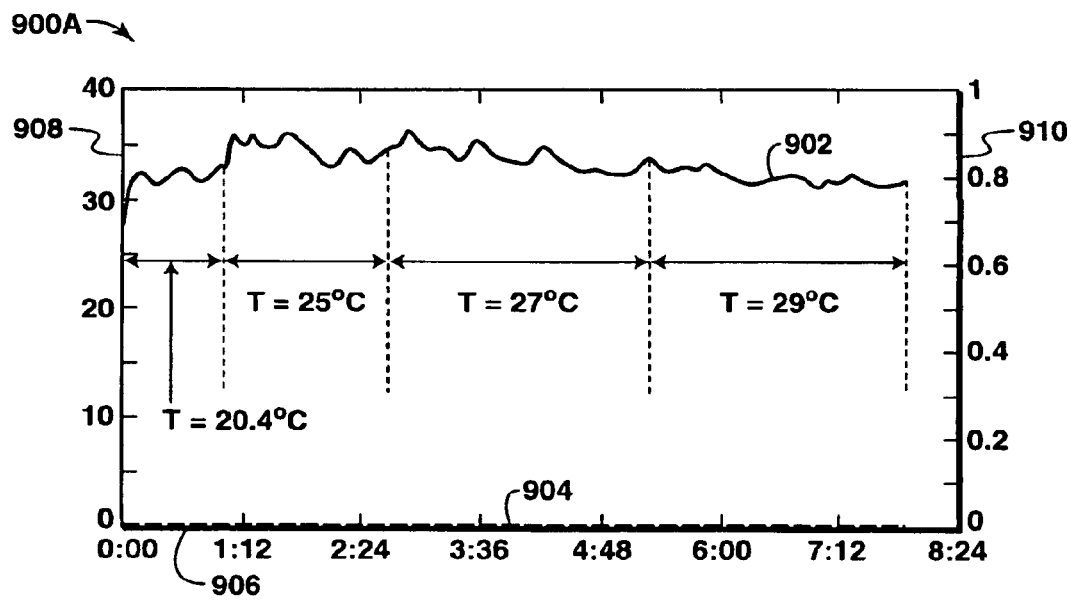
FIG. 9A is a graph plotting pressure gradient at a controlled temperature.
Figure 9B:
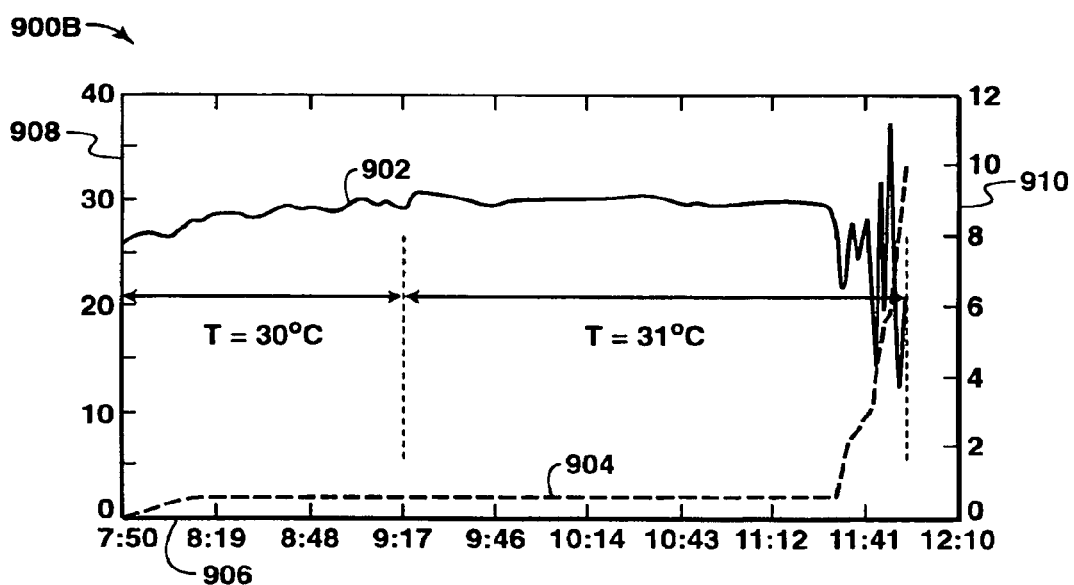
FIG. 9B is a continuation of the test shown in FIG. 9A, plotting pressure gradient at higher controlled temperatures.

A similar test was conducted in a core with a permeability of 577 D. The test is shown in graphs 900A and 900B of FIGS. 9A and 9B, respectively. Graph 900B is a continuation of graph 900A and the graphs show pressure gradient at a controlled temperature. For this third test, a waxy-SSE was injected into a beadpack with a 577 D glass matrix. In each figure, elapsed time 906 is shown on the x-axis in hours and minutes. Applied pressure gradient (measured in psi/ft) is plotted along the left y-axis 908, while cumulative volume injected (measured in ml) is plotted along the right y-axis 910.

The pressure gradient 908 remained substantially constant at approximately 30 psi/ft, shown as line 902. The temperature was gradually increased to generate a plug failure, shown at dashed intervals. The temperature of the core was raised from 20.4° C. to 31° C. The injected volume is shown as line 904. Graph 900A shows that the plug did not fail (yield to flow) through 29° C.

Graph 900B shows that a small amount of flow occurred when the temperature was raised to 30° C. However, the plug was still able to withstand a pressure gradient 902 of 30 psi/ft. The plug finally failed when the core reached a temperature of 31° C. at a pressure gradient 902 of 30 psi/ft. Because the anticipated maximum pressure gradient on the plugged thief zone in actual field operations was about 25 psi/ft at a maximum temperature of 25° C., this waxy oil-external emulsion met field specifications.

A fourth test was conducted to demonstrate that the solidified waxy oil-external emulsion could be mobilized and removed from near-wellbore regions of normal formation inadvertently invaded by the emulsion during squeeze placement into the selected target thief zone. A series of tests was conducted using cores of approximately 5,000 mD, representative of the normal formation permeability. In the tests, the melted emulsion was flowed through the cores at a temperature of 40° C. The cores were allowed to cool to the reservoir temperature of 18° C. The cores were then "aged" for the times specified below. After aging, an injection of crude oil heated to 40° C. was attempted to determine the applied pressure gradient required to soften, flow, and dissolve the emulsion in the injected crude oil.

Figure 10:
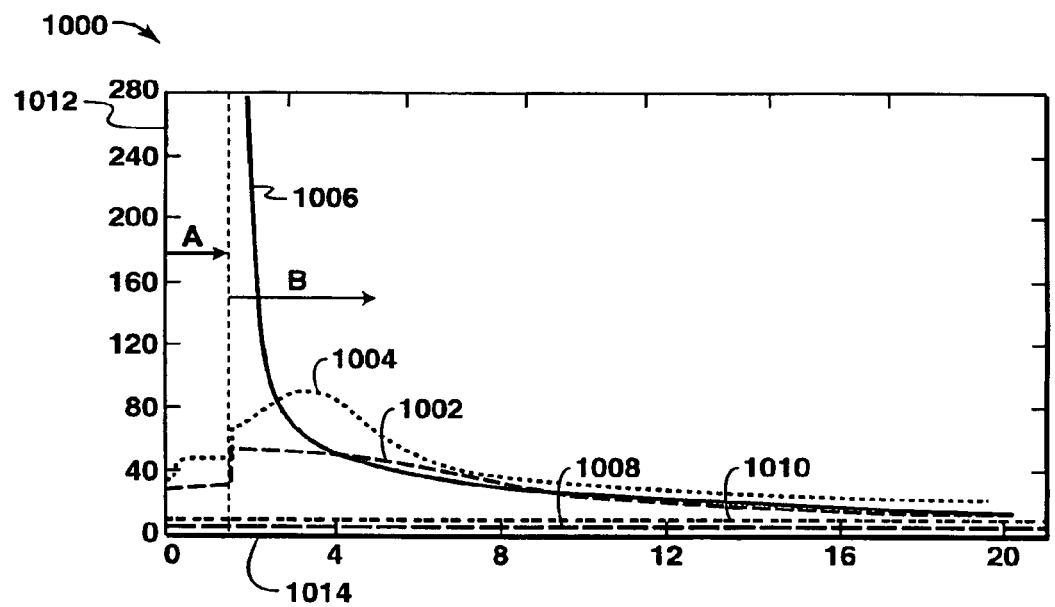
FIG. 10 is a graph in which pressure gradient is applied against various cores containing a waxy emulsion.

In FIG. 10, graph 1000 shows the results of tests conducted after cores treated with a waxy emulsion had aged in a quiescent state for various time periods. Each core had a permeability of about 5,000 mD. The cores were:

5,100 mD core, aged three days (noted as line 1002),
4,500 mD core, aged five days (noted as line 1004), and
4,540 mD core, aged seventeen days (noted as line 1006).

The applied pressure gradient 1012 is shown on the y-axis and has a range of 0 to 280 psi/ft. The applied pressure gradient 1012 is measured over time 1014, which is shown on the x-axis and has a range of 0 to 20 hours. When a pressure gradient 1012 was initially applied to the cores, noted as section A on graph 1000, no flow occurred. The applied pressure gradient 1012 was increased until flow occurred, noted as section B on graph 1000. After flow began, injection was maintained at a flow rate of 0.5 feet per day (ft/d), and the resulting applied pressure gradient 1012 was measured.

For the core that aged only three days 1002, the maximum applied pressure gradient was 51 psi/ft. For the core that aged five days 1004, the maximum applied pressure gradient was 87 psi/ft. For the core that aged 17 days 1006, the plug resisted flow until a pressure gradient of approximately 274 psi/ft was reached.

As a point of reference, applied pressure gradients for the flow of oil (noted as line 1008) and a water-in-oil emulsion without added wax (noted as line 1010) each heated to 40° C. were measured in cores with similar permeabilities of about 5,000 mD. A pressure gradient of 3 psi/ft was capable of moving the heated oil 1008 only. Similarly, a heated water-in-oil emulsion without added wax 1010 was moved at a pressure gradient of 6 psi/ft.

These results show that even though the strength of the plug increased with aging time, heated oil may be injected to restore flow through any unwanted plugged regions without requiring undue pressure downhole. Because a waxy emulsion may not typically penetrate a normal formation sand to a radial depth of more than 1 to 2 feet, the operator may choose to selectively isolate the unwanted plugged region by setting packers above and/or below the region, so that the heated oil contacts only the unwanted plugged region.

Example 2

Research Field Test

A research field test was conducted to repair a high permeability zone between a producer and injector using the waxy emulsion composition in Table 3. Production was being conducted from a heavy oil reservoir in an unconsolidated sand formation. Production of sand suspended in the heavy crude oil generated a wormhole or channel from the producer of a normal 5-spot pattern to one of the injectors. The distance between the injector and producer was approximately 100 feet. The undisturbed reservoir sand had an average permeability of approximately 5,000 mD. The in situ oil viscosity at reservoir conditions was 2,300 cp. Reservoir temperature was 18° C., but injected fluid entered the pay at the injector at a temperature of approximately 23° C. Therefore, a temperature of 25° C. (to provide a safety margin) was selected as $T_{ds}$, the maximum temperature at which the injected waxy emulsion was required to retain sufficient gel strength to prevent subsequent flow during normal reservoir operations.

The volume of the channel between the injector and producer was measured by flowing a fluid tagged with a chemical tracer from the injector to the producer. The volume of the channel was determined to be approximately 14 barrels (2.25 cubic meters ($m^3$)), and the effective permeability of the channel was estimated to be approximately 9,675 D. Because of this extreme transmissibility prior to treatment, fluid injected at the injector arrived at the producer within 16 hours rather than the normal expected residence time of three years without the presence of a channel. The pressure difference between the injector and the producer had been reduced from 980 psi to 300 psi.

Figure 11:
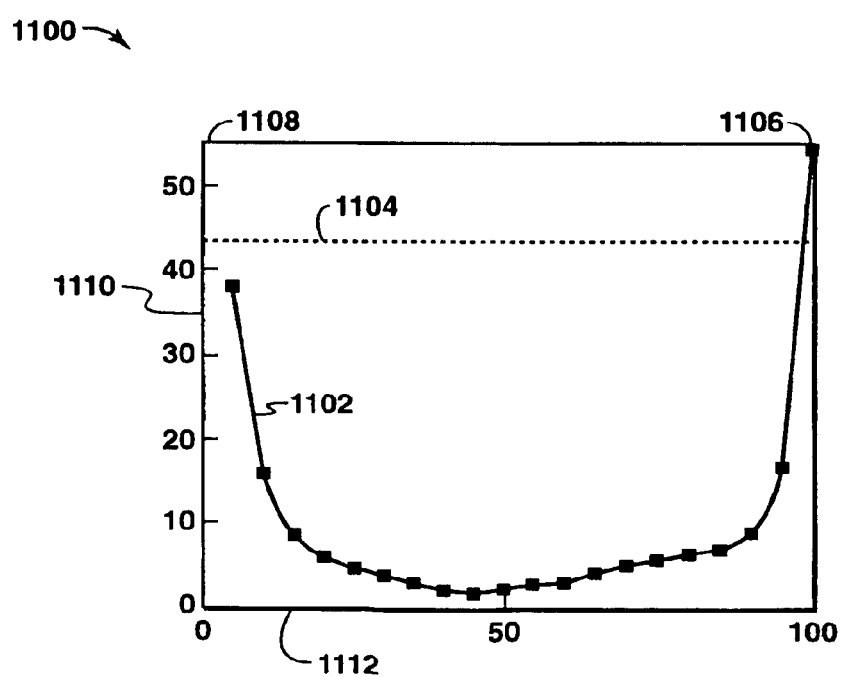
FIG. 11 illustrates a graph of a pressure gradient in a high permeability zone between an injection and production well.

In FIG. 11 graph 1100 demonstrates the pressure gradient 1110 (in psi/ft with a numerical scale on the y-axis) computed over the distance 1112 (in feet with a numerical scale on the x-axis) between the injector 1106 and producer 1108 during normal reservoir operations. The pressure gradient 1110 during normal reservoir operations is indicated as line 1102. At the producer 1108, the pressure gradient 1110 was predicted to be almost 40 psi/ft. At the injector 1106, the pressure gradient 1110 was predicted to be in excess of 50 psi/ft. However, the pressure gradient 1110 rapidly falls off within a few feet of both wells to less than 20 psi/ft. Based upon these data, the desired minimum gel strength was approximately 40 psi/ft at $T_{ds}$. This gel strength provides flow resistance over all radial distances from the wellbores except for perhaps within the first foot of the injector.

The straight, dotted line in graph 1100 indicated as 1104 shows the measured gel strength of the waxy oil-external emulsion formulated for the field in the laboratory demonstration described above. The emulsion was designed to be injected into a high permeability zone between the producer and injector. At a gel strength of 43 psi/ft, the emulsion would be able to withstand the estimated pressure gradient between the two wells. Therefore, water and oil would flow around the high permeability zone plugged with emulsion and through the matrix.

Figure 12:
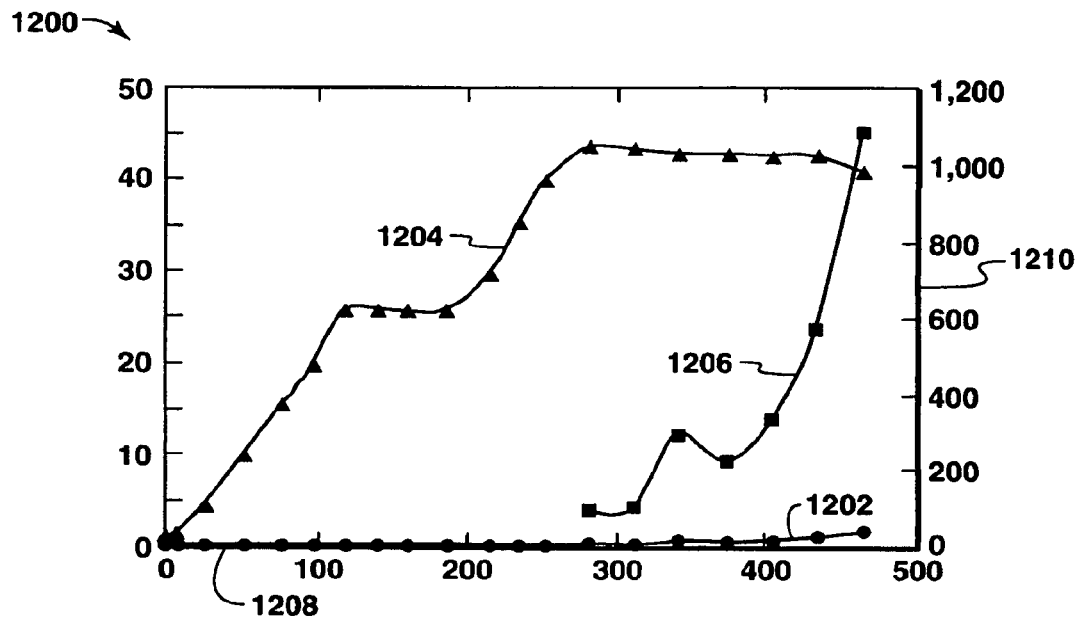
FIG. 12 is a gel strength test of the selected waxy emulsion for a field test.

In FIG. 12 graph 1200 shows a gel strength test conducted on the field formulation using procedures similar to those described in the laboratory test example. Graph 1200 plots (1) flow rate (line 1202 measured in cc/min×100 with a numerical scale on the left hand y-axis), (2) applied pressure gradient (line 1204 measured in psi/ft with a numerical scale on the left hand y-axis), and (3) effective permeability (line 1206 measured in mD with a numerical scale on the right hand y-axis 1210) against elapsed time 1208 (measured in minutes with a numerical scale on the x-axis).

In the test, the waxy emulsion was injected into a 500 D beadpack (1-inch diameter×6 inches long) to simulate the thief zone. The emulsion was injected at a temperature of 40° C. The beadpack or core was then allowed to cool to 18° C. for an aging period of 50 hours. Thereafter, an increasing pressure gradient 1204 was applied to the core using an injected oil.

An initial pressure gradient of 0 psi/ft existed against the core. However, over the course of 119 minutes the pressure gradient was increased linearly to 26 psi/ft. This pressure gradient 1204 was held for an hour. No fluid flow 1202 occurred. The pressure gradient 1204 on the core was then increased to the target level of 40 psi/ft. The flow rate 1202 remained at zero. At 282 minutes, the pressure gradient 1204 was increased to 43 psi/ft. This pressure gradient was held for over three hours. The flow rate 1202 remained at about zero. From the test, the gel strength of the waxy emulsion was 43 psi/ft. Therefore, the waxy emulsion was capable of withstanding the anticipated pressure gradient between the producer and injector.

Also shown in graph 1200 is the effective permeability 1206 demonstrated by the failed plug. The permeability 1206 increased from 87 mD to 1,076 mD. However, this was not enough to permit more than a minimal flow rate 1202 through the core. Even after failure, permeability 1206 had been reduced by a factor of 1/500 or to a value 0.2% of the initial permeability 1206 of the core.

At the field site, the thief zone and injector were preheated by injecting 46 m³ of a fluid at a temperature of 45° C. over six days. This enhanced the ability to achieve deep penetration in the reservoir with the subsequently injected waxy emulsion. Using the composition in Table 3, the components were heated and mixed, and the resulting waxy emulsion was injected through the wellbore of the injector. Injection of the heated emulsion into the selected target thief zone was executed in a multi-stage squeeze treatment in accordance with the methods of 100 in FIGS. 1 and 300 in FIG. 3.

Figure 13:
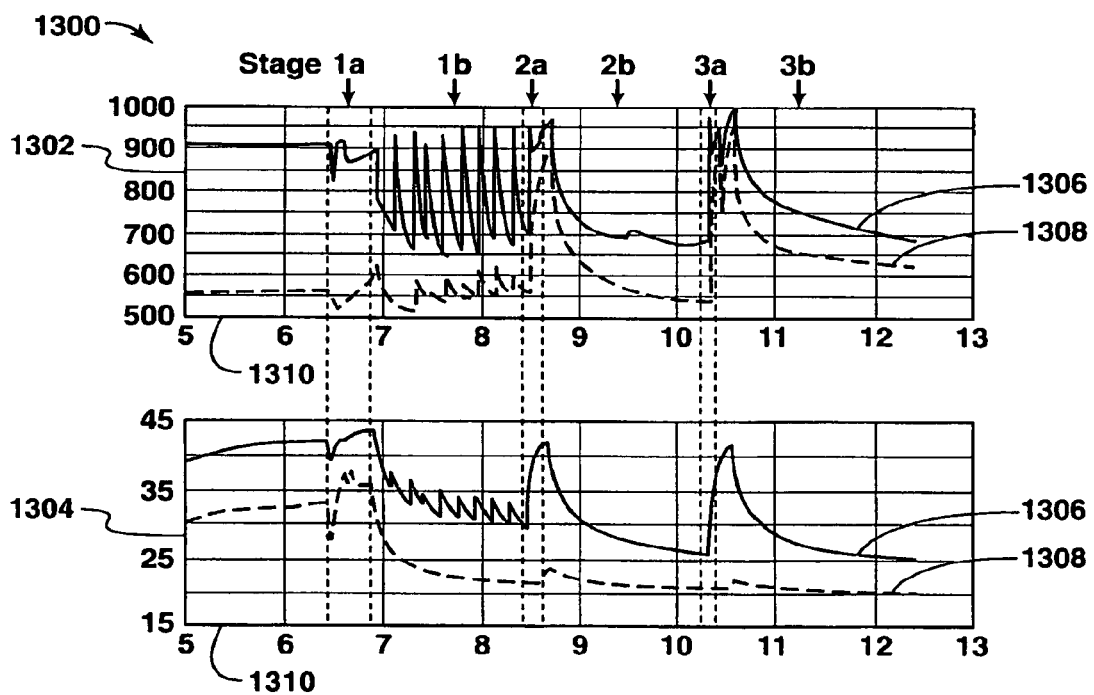
FIG. 13 is a graph that plots bottomhole temperature and pressure against time for two different wells.

During the injections, the bottomhole pressure and bottomhole temperature in both the injector and an offset producer were monitored. A high permeability channel existed between these two wells. In FIG. 13 graph 1300 shows the bottomhole pressure 1302 (measured in psia with a numerical scale on the y-axis) and temperature 1304 (measured in ° C. with a numerical scale on the y-axis) measured in the injector and producer during the squeeze treatments, noted as lines 1306 and 1308, respectively. Three different squeezes are shown. The time 1310 (measured in days with a numerical scale on the x-axis) shown in graph 1300 is elapsed time since the start of the preheat injection. During the first squeeze, 2.8 m³ of the heated waxy emulsion was injected during stage 1a. The offset producer was shut in; however, downhole pressure 1302 and temperature 1304 were monitored in the producer to assist in interpreting effectiveness of the emulsion placement.

After the initial injection of stage 1a, the waxy emulsion was allowed to cool. A cooling period of approximately 29 hours was provided. During this 29 hour period, denoted as stage 1b, the tubing was periodically filled to surface with small volumes (approximately 0.13 m³ each) of waxy emulsion to maintain positive squeeze pressure on the plug. These were in the form of brief pulses, which also served to maintain wellbore temperature and prevent wax solidification in the injection tubing. A total volume of 1.26 m³ of emulsion was injected during stage 1b.

Next, a stage 2a squeeze was performed by injecting an additional 2.55 m³ of waxy emulsion. A 39 hour cooling period (stage 2b) without injection followed. Finally, during stage 3a, another 2.94 m³ of waxy emulsion was injected at an average rate of 11.8 m³/d. The well was then shut in to allow the plug to cool and solidify (stage 3b).

It can be seen from graph 1300 that the bottomhole pressure 1302 and temperature 1304 in the injector remained above those of the producer. Of greater interest, the bottomhole pressures 1302 in the two wells was greater following the stage 3a injection (during stage 3b) than those following the stages 1a and 2a injections (during stages 1b and 2b). This demonstrates that the permeability was reduced and the high permeability volume was plugged.

Subsequent to performing this treatment, the injection wellbore was cleaned of waxy emulsion by circulating a fluid at 41° C. through coiled tubing and back to the surface. After cleaning the residual wax from the wellbore, 2 m³ of fluid was injected at a bottomhole pressure of 820 psi with no pressure or temperature response observed at the offset producer. Thus, the transmissibility between the wells had been restored to near original, and the high permeability channel had been plugged between the wells.

As described above, a composition for plugging a high permeability zone in a subsurface reservoir is provided. The composition comprises a water-in-oil emulsion with added wax to adjust the melting range. The waxy emulsion can be mixed and stored without worry regarding premature gelling or crosslinking caused by chemical reaction in surface facilities and flow lines, as no gelling or crosslinking agents are added to the emulsion during or following injection. Keeping the emulsion heated to a temperature above its melting range during the injection process is sufficient for operability. This has practical operational advantages, because well activities are often interrupted for periods of several hours or days by mechanical or other difficulties. The present emulsion may not plug flow and injection lines as long as it is in a heated state. In this way, plugging of injection and flow lines does not occur even if injection cannot be completed on the time schedule planned.

The waxy emulsion also has the advantage of using water in the mixture. The use of water in the form of a water-in-oil emulsion increases the viscosity of the injected fluid to achieve favorable mobility control during displacement of fluids residing in the high permeability region to be treated. Further, inclusion of water in the injected fluid increases the heat capacity, allowing the injected fluid to retain heat for a longer period compared to a single-phase wax. Also, inclusion of water in the injected fluid significantly reduces cost per volume of the fluid, since water is significantly less expensive than wax or oil.

The waxy emulsion can be injected in liquid form and can be injected at considerable distances from the wellbore to reach distant high permeability zones. Once in place, the emulsion achieves high resistance to flow at pressure gradients created within the reservoir during normal flow. The emulsion is also amenable to being easily cleaned up or removed from lower permeability zones inadvertently invaded near-wellbore during placement.

While it will be apparent that the invention described herein achieves the benefits and advantages set forth above and others, it will be appreciated that the invention is susceptible to modification, variation, and change without departing from the spirit thereof. For example, another problem that can be solved using the current invention relates to high water production from zones containing high water saturation. Using the waxy emulsion disclosed herein, such zones can be plugged to fluid flow even though the zone may not contain permeability significantly higher than the permeability within the bulk of the formation. In this case, if the oil residing within the formation is significantly more viscous than water, the mobility of water in the high water saturation zones may be significantly higher than the mobility of oil in zones of lower water saturation, and the well may produce at a very high water cut. In one aspect, zones of high water saturation in oil reservoirs can be plugged by injecting the waxy emulsion disclosed in the current invention, while restricting injection into the strata or zones containing high oil saturation. Upon cooling after injection, the solidified emulsion effectively restricts the flow of water through the strata or zone containing high water saturation.

NOMENCLATURE

| Abbreviation or Symbol | Definition |
| --- | --- |
| API | American Petroleum Institute |
| cc | cubic centimeter |
| cp | centipoise |
| cSt | centistoke |
| C | Celsius |
| D | Darcy |
| d | day |
| ft | foot |
| g | gram |
| L | liter |
| m³ | cubic meter |
| mD | milli-Darcy |
| min | minute |
| ml | milliliter |
| N- | normal |
| $P_{res}$ | reservoir pressure |
| psi | pounds per square inch |
| psia | pounds per square inch (absolute) |
| s | seconds |
| SSE | solids-stabilized emulsion |
| $T_{ds}$ | desired stable operating temperature |
| $T_{itz}$ | zone injection temperature |
| $T_{res}$ | reservoir temperature |
| wt | weight |
| $\mu_o$ | oil viscosity |
| $\mu_w$ | brine viscosity |
| ° | degree |
| % | percent |
| ® | registered trademark |
| ™ | trademark |

What is claimed is:

1. A method of plugging a selected zone in a subsurface formation, comprising:
   determining a targeted temperature in the selected zone of the subsurface formation; and
   formulating a waxy oil-external emulsion comprising oil, water, and added wax such that the waxy oil-external emulsion is formulated to be a liquid at a temperature greater than the targeted temperature, but a solid substantially at about the targeted temperature; and
   plugging the selected zone using the waxy oil-external emulsion.

2. The method of claim 1, wherein the targeted temperature is the temperature of fluids resident in the subsurface formation.

3. The method of claim 1, wherein the targeted temperature is the maximum operating temperature of the subsurface formation.

4. The method of claim 1, wherein the selected zone has a permeability greater than the average permeability of a producing interval.

5. The method of claim 1, further comprising:
   determining the viscosity of resident fluids in the selected zone; and
   wherein the waxy oil-external emulsion is further formulated to have a viscosity substantially equal to or greater than that of the resident fluids in the selected zone, so that the waxy oil-external emulsion displaces the resident fluids upon injection as a liquid.

6. The method of claim 1, wherein the waxy oil-external emulsion is further formulated to have a gel strength at the targeted temperature sufficient to plug the selected zone during production of reservoir fluids from the subsurface formation.

7. The method of claim 1, wherein the oil is a crude oil.

8. The method of claim 1, wherein the added wax is a petroleum-derived wax.

9. The method of claim 1, wherein the added wax is a non-petroleum wax.

10. The method of claim 1, wherein the waxy emulsion further comprises an emulsifying agent.

11. The method of claim 10, wherein the emulsifying agent comprises a surfactant.

12. The method of claim 10, wherein the emulsifying agent comprises fine mineral solids.

13. The method of claim 12, wherein the oil is crude oil and the fine mineral solids are natural mineral fines already existing in the crude oil.

14. The method of claim 1, wherein the waxy oil-external emulsion further comprises a solvent.

15. The method of claim 1, further comprising:
injecting the waxy oil-external emulsion into the selected zone; and
permitting the waxy oil-external emulsion to cool over a period of time to cure into a solid.

16. The method of claim 1, further comprising:
heating the waxy oil-external emulsion to a temperature above its melting range;
injecting the waxy oil-external emulsion into a wellbore that accesses the subsurface formation;
further injecting the waxy oil-external emulsion through the wellbore and into the selected zone to displace fluids within the selected zone; and
shutting in the wellbore for a period of time sufficient to allow the waxy oil-external emulsion to transition from a liquid to a solid, so as to plug at least a portion of the selected zone.

17. The method of claim 16, wherein the period of time is between about 3 days to about 7 days.

18. The method of claim 16, further comprising injecting heated fluids into the wellbore prior to shutting in the wellbore to displace a substantial portion of the waxy oil-external emulsion from the wellbore and into the selected zone.

19. The method of claim 18, further comprising:
determining an estimated volume of the selected zone to be plugged; and
wherein injecting the waxy oil-external emulsion through the wellbore and into the selected zone comprises injecting an amount of waxy oil-external emulsion through an injection tubing to substantially fill the estimated volume.

20. The method of claim 19, wherein injecting the waxy oil-external emulsion through the wellbore and into the selected zone is performed by injecting the waxy oil-external emulsion into an injection well.

21. The method of claim 19, wherein injecting the waxy oil-external emulsion through the wellbore and into the selected zone is performed by injecting the waxy oil-external emulsion into a production well.

22. The method of claim 19, further comprising:
injecting a volume of displacement fluid to displace the waxy oil-external emulsion in the injection tubing.

23. The method of claim 22, further comprising:
circulating a heated cleaning fluid through the injection tubing to remove the solidified waxy oil-external emulsion from the wellbore.

24. The method of claim 19, further comprising:
determining the viscosity of fluids resident in the selected zone; and
adjusting the viscosity of the waxy oil-external emulsion by adding a solvent to cause the viscosity of the waxy oil-external emulsion to be about 1.25 to about 3.0 times greater than the fluids resident in the selected zone.

25. A method of plugging a high permeability zone in a subsurface formation, comprising:
heating a waxy oil-external emulsion comprised of oil, added wax, and water to a temperature above a melting range of the waxy oil-external emulsion;
injecting the waxy oil-external emulsion into a wellbore in fluid communication with the subsurface formation;
further injecting the waxy oil-external emulsion through the wellbore and into a high permeability zone in the subsurface formation to displace fluids within the high permeability zone;
shutting in the wellbore for a period of time sufficient to allow the waxy oil-external emulsion to transition from a liquid to a solid so as to substantially plug at least a portion of the high permeability zone.

26. The method of claim 25, further comprising injecting heated oil into the wellbore prior to shutting in the wellbore to displace a substantial portion of the waxy oil-external emulsion from the wellbore and into the high permeability zone.

27. The method of claim 26, further comprising producing reservoir fluids from the subsurface formation.

28. The method of claim 27, wherein producing reservoir fluids from the subsurface formation occurs without substantial flow of reservoir fluids through the plugged high permeability zone.

29. The method of claim 27, further comprising injecting displacement fluids into an injection well to sweep reservoir fluids towards a production wellbore without substantial flow of reservoir fluids through the plugged high permeability zone.

30. The method of claim 25, wherein the waxy oil-external emulsion further comprises an emulsifying agent.

31. The method of claim 25, wherein the waxy oil-external emulsion further comprises a solvent.

32. A method of plugging a selected zone in a subsurface formation, comprising:
heating a first volume of a waxy oil-external emulsion, the waxy oil-external emulsion being comprised of oil, added wax, and water to a temperature above a melting range of the first volume of the waxy oil-external emulsion;
injecting the first volume of waxy oil-external emulsion into a wellbore and into a selected zone in a subsurface formation to displace fluids within the selected zone;
shutting in the wellbore for a first period of time sufficient to allow the first volume of waxy oil-external emulsion to transition from a liquid to a solid so as to plug at least a portion of the selected zone;
heating a second volume of the waxy oil-external emulsion;
injecting the second volume of the waxy oil-external emulsion into the wellbore and into the selected zone to fill at least a portion of any remaining voids within the selected zone; and
shutting in the wellbore for a second period of time sufficient to allow the second volume of waxy oil-external emulsion to transition from a liquid to a solid so as to further plug the selected zone.

33. The method of claim 32, further comprising circulating a heated cleaning fluid through an injection tubing to remove solidified emulsion from the wellbore.

34. A method of formulating a plugging agent for a subsurface reservoir, comprising:
acquiring oil;
selecting a plurality of wax additives;
blending the oil and the plurality of wax additives in various weight percentages to form a plurality of hydrocarbon blends;
determining the melting range of each of the plurality of hydrocarbon blends;
determining the viscosity of each of the plurality of hydrocarbon blends;
comparing the melting range of each of the plurality of hydrocarbon blends to a targeted operating temperature of the subsurface reservoir; and
selecting the at least one of the plurality of hydrocarbon blends having a melting range above the targeted operating temperature.

35. The method of claim 34, further comprising adding water to the at least one of the plurality of hydrocarbon blends to form a water-in-oil emulsion.

36. The method of claim 35, wherein adding water further comprises adding an emulsifying agent to emulsify the water with the oil.

37. The method of claim 36, wherein the oil is a heavy crude oil, and the emulsifying agent comprises fine mineral solids.

38. The method of claim 35, wherein the water content is between about 40 to about 60 volume percent.

39. The method of claim 34, further comprising adding a solvent to the at least one of the plurality of hydrocarbon blends.

40. The method of claim 34, further comprising:
determining the viscosity of fluids in the subsurface reservoir; and
selecting the at least one of the plurality of hydrocarbon blends to have a viscosity substantially equal to or greater than that of fluids in the subsurface reservoir when the at least one of the plurality of hydrocarbon blends is at or above the targeted operating temperature.

41. The method of claim 40, further comprising:
determining the pressure gradient existing in the subsurface reservoir; and
confirming that the at least one of the plurality of hydrocarbon blends has a gel strength at the targeted operating temperature in excess of the pressure gradient.

42. The method of claim 41, further comprising increasing the weight percentage of the wax additive in the at least one of the plurality of hydrocarbon blends to increase the gel strength of the plugging agent.

43. The method of claim 34, wherein the oil is crude oil.

44. The method of claim 34, wherein the wax additives are petroleum-derived waxes.

45. The method of claim 34 wherein the wax additives are non-petroleum waxes.

46. The method of claim 34, further comprising:
determining the congealing points of the plurality of hydrocarbon blends; and
selecting the at least one of the plurality of hydrocarbon blends to have a congealing point above the targeted operating temperature.

* * * * *